US009892057B2

(12) United States Patent
Levy et al.

(10) Patent No.: US 9,892,057 B2
(45) Date of Patent: Feb. 13, 2018

(54) SINGLE DOUBLE CUCKOO HASH

(71) Applicant: MELLANOX TECHNOLOGIES TLV LTD., Raanana (IL)

(72) Inventors: Gil Levy, Hod Hasharon (IL); Salvatore Pontarelli, Rome (IT); Pedro Reviriego, Madrid (ES)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 116 days.

(21) Appl. No.: 15/086,095

(22) Filed: Mar. 31, 2016

(65) Prior Publication Data
US 2017/0286292 A1    Oct. 5, 2017

(51) Int. Cl.
| G06F 12/10 | (2016.01) |
| G06F 12/1018 | (2016.01) |
| G06F 12/02 | (2006.01) |
| G06F 12/04 | (2006.01) |
| G06F 17/30 | (2006.01) |
| H04L 12/743 | (2013.01) |

(52) U.S. Cl.
CPC ...... *G06F 12/1018* (2013.01); *G06F 12/0292* (2013.01); *G06F 12/04* (2013.01); *G06F 17/3033* (2013.01); *H04L 45/7453* (2013.01); *H04L 45/7457* (2013.01)

(58) Field of Classification Search
CPC ............ G06F 12/1018; G06F 17/3033; G06F 17/30097; G06F 17/30321; G06F 17/30949; H04L 45/745; H04L 69/22
See application file for complete search history.

(56) References Cited

U.S. PATENT DOCUMENTS

| 6,611,875 | B1 | 8/2003 | Chopra et al. |
| 8,271,564 | B2 | 9/2012 | Dade et al. |
| 8,290,934 | B2 | 10/2012 | Stergiou et al. |
| 8,305,271 | B2 | 11/2012 | Li et al. |
| 9,111,615 | B1 | 8/2015 | Jiang |
| 9,171,030 | B1 | 10/2015 | Arad et al. |

(Continued)

OTHER PUBLICATIONS

Demetriades et al., "An Efficient Hardware-basedMulti-hash Scheme for High Speed IP Lookup", 16th IEEE Symposium on High Performance Interconnects, pp. 103-110, Aug. 26-28, 2008.

(Continued)

*Primary Examiner* — Reginald Bragdon
*Assistant Examiner* — Thanh Vo
(74) *Attorney, Agent, or Firm* — D. Kliger IP Services Ltd.

(57) ABSTRACT

In a network element a decision apparatus has a plurality of multi-way hash tables of single size and double size associative entries. A logic pipeline extracts a search key from each of a sequence of received data items. A hash circuit applies first and second hash functions to the search key to generate first and second indices. A lookup circuit reads associative entries in the hash tables that are indicated respectively by the first and second indices, matches the search key against the associative entries in all the ways. Upon finding a match between the search key and an entry key in an indicated associative entry. A processor uses the value of the indicated associative entry to insert associative entries from a stash of associative entries into the hash tables in accordance with a single size and a double size cuckoo insertion procedure.

20 Claims, 12 Drawing Sheets

(56) References Cited

U.S. PATENT DOCUMENTS

| | | | |
|---|---|---|---|
| 9,223,711 | B2 | 12/2015 | Philip et al. |
| 9,317,517 | B2 | 4/2016 | Attaluri et al. |
| 9,344,366 | B2 | 5/2016 | Bouchard et al. |
| 9,262,312 | B1 | 5/2017 | Gazit et al. |
| 9,659,046 | B2 | 5/2017 | Sen et al. |
| 9,779,123 | B2 | 10/2017 | Sen et al. |
| 9,785,666 | B2 | 10/2017 | Li et al. |
| 2002/0089937 | A1 | 7/2002 | Venkatachary et al. |
| 2008/0228691 | A1 | 9/2008 | Shavit et al. |
| 2010/0080223 | A1 | 4/2010 | Wong et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2015/0052309 | A1* | 2/2015 | Philip ................ G06F 12/0864 711/128 |
| 2015/0058595 | A1* | 2/2015 | Gura .................. G06F 12/1018 711/206 |
| 2015/0127900 | A1 | 5/2015 | Dharmapurikar et al. |
| 2017/0046395 | A1 | 2/2017 | Li et al. |

OTHER PUBLICATIONS

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Kasnavi et al., "A cache-based Internet protocol address lookup architecture", Computer Networks, vol. 52, pp. 303-326, year 2008.

Levy et al., U.S. Appl. No. 14/827,373, filed Aug. 17, 2015.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Levy et al., U.S. Appl. No. 14/827,402, filed Aug. 17, 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Levy et al., U.S. Appl. No. 14/846,777, filed Sep. 6, 2015.

U.S. Appl. No. 14/827,373 office action dated Oct. 6, 2017.

U.S. Appl. No. 14/846,777 office action dated Nov. 30, 2017.

* cited by examiner

SINGLE DOUBLE CUCKOO HASH

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to electrical digital data processing. More particularly, this invention relates to data storage and access using hashing techniques.

2. Description of the Related Art

The meanings of certain acronyms and abbreviations used herein are given in Table 1.

TABLE 1

Acronyms and Abbreviations

| | |
|---|---|
| ASIC | Application-Specific Integrated Circuit |
| CAM | Content Addressable Memory |
| SRAM | Static Random Access Memory |

Hash tables are widely used in computer applications, communications, and logic circuits to implement associative arrays, i.e., data structures that map keys to values. For example, J hash tables are used in network switching elements, such as bridges and routers, to map keys that are derived from specified header fields of packets received by the switching element to instructions that are to be applied in forwarding the packets by the switching element. Many other applications of hash tables are known in the art.

A hash table uses a hash function to compute, for each key, an index to a "slot" in an array where the desired value is held. Such hash functions are chosen so as to provide a uniform distribution of hash results, and thus minimize the number of collisions between different keys, i.e., occurrences in which the hash function maps two (or more) keys to the same slot. Most hash table designs assume that collisions will occur and provide techniques for accommodating collisions and minimizing their effect on lookup performance. Arash Partow gives a useful survey of hashing techniques and definitions of available hash functions on the "hash functions" page of the "programming" section in the partow.net Web site.

One useful approach to avoidance of collisions is "cuckoo hashing," described by Pagh and Rodler in an article entitled "Cuckoo Hashing," *Journal of Algorithms* 51 (2004), pages 122-144. As described by the authors, cuckoo hashing uses two hash tables, T1 and T2, each accessed by a different, respective hash function, h1 or h2. When inserting a new element with key x into the tables, both h1 (x) and h2(x) are computed, and if one of the corresponding slots is vacant, the value for x is inserted there. (Either slot may be chosen if both are vacant.) When both slots are occupied, however, the current occupant of one of the slots, for example, an existing element with key y, such that h1(y)=h1(x), is ejected from its slot and moved to the slot with index h2(y). If this latter slot is also occupied (for example, by an element with key z such that h2(z)=h2(y), this process of ejection and replacement will continue until a vacant slot is found or until a predefined timeout period has expired. In the latter case, the tables will be recomputed using new hash functions.

Advantageously, cuckoo hashing can achieve high utilization of the memory space that is available for hash tables: By ejecting and replacing table entries as described above, it is possible to populate a large percentage of the available slots, and thus the memory area required to contain a given corpus of entries is reduced relative to other hashing techniques that are known in the art. Even so, to maximize occupancy of available memory using conventional cuckoo hashing techniques, it is generally necessary to use multiple memory banks, each containing multiple ways (for example, four two-way banks or two four-way banks). An additional content-addressable memory (CAM) may also be needed to hold entries for which the cuckoo insertion process failed due to repeated collisions with existing entries in the hash tables.

Depending on the specific function to be applied to a packet, a key can be formed by different parts of the packet header. For example, for routing the destination address may be sufficient while for security additional fields such as the source address, the protocol and the source and destination ports may be used. Therefore, the keys can have different sizes. This poses a practical problem for existing cuckoo hash implementations as they only support a single key size. Naïve solutions like using the largest size for all the entries or dividing the cuckoo tables in different parts allocated to each entry size have significant drawbacks. In the first case, memory is wasted when small size entries are stored. The second solution reduces the flexibility to dynamically add keys as the partition among key sizes is fixed and also increases the complexity of the implementation. For example, the hash functions have to cover arbitrary ranges. Therefore supporting different size entries in cuckoo hashing would be beneficial to efficiently implement decision logic in a network element. A configuration that supports single and double size entries is of special interest as it can cover many practical applications and be implemented with reasonable complexity.

SUMMARY OF THE INVENTION

There is provided according to embodiments of the invention a decision apparatus having a first memory bank containing a plurality of hash tables of associative entries that have a respective entry key and a respective value. The hash tables are accessible in multiple ways including a first way and a second way. The associative entries including single size items and double size items. The apparatus includes a second memory bank containing a stash of associative entries and a logic pipeline, which is configured to receive a sequence of data items and to extract a search key from each of the data items. The logic pipeline includes a hash circuit configured to apply first and second hash functions to the search key to generate first and second indices, a lookup circuit configured to read the associative entries in the hash tables that are indicated respectively by the first and second indices, to match the search key against the associative entries of the hash tables in all the ways, and upon finding a match between the search key and the respective entry key in an indicated associative entry, to output the respective value from the indicated associative entry. The apparatus includes a processor, configured to use the respective value output by the lookup circuit to insert the associative entries of the stash into the hash tables in accordance with a single size cuckoo hashing insertion procedure and a double size cuckoo hashing insertion procedure for the single size items and the double size items, respectively.

According to one aspect of the apparatus, the single size cuckoo hashing insertion procedure for a selected single size item includes conducting a first search of the hash tables for a first position having first and second vacant ways, and when the first search is successful, storing the selected single size item in one of the first and second vacant ways.

When the first search is unsuccessful, the single size cuckoo hashing insertion procedure includes conducting a second search of the hash tables for a second position, wherein the first way of the second position is vacant and the second way of the second position is occupied, and when the second search is successful, storing the selected single size item in the first way of the second position.

When the second search is unsuccessful and when a predetermined probability is satisfied, the single size cuckoo hashing insertion procedure includes evicting an occupant of one of the ways of a chosen position of one of the hash tables into the stash and storing the selected single size item in the one way of the chosen position. When the predetermined probability is not satisfied, the single size cuckoo hashing insertion procedure includes conducting a third search of the hash tables for a third position wherein the first way and the second way of the third position have respective first and second occupying single size items, and when the third search is successful, evicting the first occupying single size item into the stash, and storing the selected single size item in the first way of the third position.

When the third search is unsuccessful, and when space for a double size item is unavailable on the stash, the single size cuckoo hashing insertion procedure includes inserting the selected single size item into the stash. When space for a double size item is available on the stash the single size cuckoo hashing insertion procedure includes evicting a double size occupant of a new chosen position of one of the hash tables into the stash, and storing the selected single size item in the new chosen position.

According to an aspect of the apparatus, the chosen position and the new chosen position are randomly chosen in the single size cuckoo hashing insertion procedure.

The double size cuckoo hashing insertion procedure for a selected double size item includes conducting a first search of the hash tables for a first position having first and second vacant ways, and when the first search is successful, storing the selected double size item in the first and second vacant ways. When the first search is unsuccessful and when a predetermined probability is satisfied, the double size cuckoo hashing insertion procedure includes evicting occupants of a chosen position of one of the hash tables into the stash, and storing the selected double size item in the first way and the second way of the chosen position.

When the predetermined probability is not satisfied, the double size cuckoo hashing insertion procedure includes conducting a second search of the hash tables for a second position wherein the first way of the second position is vacant and the second way of the second position has an occupying single size item, and when the second search is successful, evicting the occupying single size item into the stash and storing the selected double size item in the second position.

When the second search is unsuccessful, the double size cuckoo hashing insertion procedure includes conducting a third search of the hash tables for a third position occupied by a double size item, and when the third search is successful evicting the occupying double size item and storing the selected double size item in the third position.

When the third search is unsuccessful, the double size cuckoo hashing insertion procedure includes evicting occupants of a new chosen position of one of the hash tables into the stash, and storing the selected double size item in the new chosen position.

According to one aspect of the apparatus, the chosen position and the new chosen position are randomly chosen in the double size cuckoo hashing insertion procedure.

There is further provided according to embodiments of the invention a decision apparatus, including a first memory bank, containing a first table of hash composition factors and a second memory bank containing second and third hash tables of associative entries. Each of the associative entries has a respective entry key and a respective value. The hash tables are accessible in multiple ways including a first way and a second way. The associative entries include single size items and double size items. The apparatus includes a third memory bank containing a stash of associative entries and a logic pipeline, which is configured to receive a sequence of data items, and to extract a search key from each data item. The logic pipeline includes a pre-hash circuit, configured to compute a first index by applying a first hash function to the search key, a first lookup circuit, which is coupled to read a hash composition factor from a location in the first memory bank indicated by the first index, a hash circuit, which is configured to compute second and third indices as different combinations, determined by the hash composition factor, of second and third hash functions applied by the hash circuit to the search key. The logic pipeline includes a second lookup circuit, which is configured to read the associative entries in the second and third hash tables that are indicated respectively by the second and third indices, and upon finding a match between the search key and the respective entry key in an indicated entry, to output the respective value from the indicated entry. The apparatus includes a processor, configured responsively to outputs of the first lookup circuit and the second lookup circuit, to insert values of the hash composition factor into the first table and the associative entries into the second and third hash tables in accordance with a single size cuckoo hashing insertion procedure and a double size cuckoo hashing insertion procedure for the single size items and the double size items, respectively.

According to an aspect of the apparatus, the single size cuckoo hashing insertion procedure for a selected single size item includes using respective first hash composition factors from the first table to iteratively conduct a first search of the hash tables for a first position, wherein the first way of the first position is vacant and the second way of the first position is occupied, and when an iteration of the first search is successful, storing the selected single size item in the first way of the first position.

When the iterations of the first search are unsuccessful, the single size cuckoo hashing insertion procedure includes iteratively conducting a second search of the hash tables for a second position having first and second vacant ways, and when an iteration of the second search is successful, storing the selected single size item in one of the first and second vacant ways.

When the iterations of the second search are unsuccessful and when a predetermined probability is satisfied, the single size cuckoo hashing insertion procedure includes evicting an occupant of one of the ways of a chosen position of one of the hash tables into the stash and storing the selected single size item in the one way of the chosen position.

When the predetermined probability is not satisfied, the single size cuckoo hashing insertion procedure includes conducting a third search of the hash tables for a third position, wherein the first way and the second way of the third position have respective first and second occupying single size items, and when the third search is successful, evicting the first occupying single size item into the stash, and storing the selected single size item in the first way of the third position.

When the third search is unsuccessful, when space for a double size item is unavailable on the stash, the single size cuckoo hashing insertion procedure includes inserting the selected single size item into the stash, and when space for a double size item is available on the stash evicting a double size occupant of a new chosen position of one of the hash tables into the stash, and storing the selected single size item in the new chosen position.

According to still another aspect of the apparatus, the chosen position, the new chosen position and the hash composition factors are selected randomly.

According to yet another aspect of the apparatus, the double size cuckoo hashing insertion procedure for a selected double size item includes iteratively conducting with respective hash composition factors from the first table a first search of the hash tables for a first position having first and second vacant ways, and when the first search is successful, storing the selected double size item in the first and second vacant ways.

When the first search is unsuccessful and when a predetermined probability is satisfied, the double size cuckoo hashing insertion procedure includes evicting occupants of a chosen position of one of the hash tables into the stash, and storing the selected double size item in the first way and the second way of the chosen position.

When the predetermined probability is not satisfied, the double size cuckoo hashing insertion procedure includes iteratively conducting a second search of the hash tables for a second position wherein the first way of the second position is vacant and the second way of the second position is occupied by a single size item, and when an iteration of the second search is successful, evicting the occupying single size item into the stash and storing the selected double size item in the second position.

When the iterations of the second search are unsuccessful, the double size cuckoo hashing insertion procedure includes conducting a third search of the hash tables for a third position occupied by a double size item, and when the third search is successful evicting the occupying double size item and storing the selected double size item in the third position.

When the third search is unsuccessful, the double size cuckoo hashing insertion procedure includes evicting occupants of a new chosen position of one of the hash tables into the stash, and storing the selected double size item in the new chosen position.

According to a further aspect of the apparatus, the chosen position, the new chosen position and the hash composition factors are selected randomly.

There is further provided according to embodiments of the invention a method, which is carried out by storing in a first memory bank a plurality of hash tables of associative entries including a respective entry key and a respective value. The hash tables are accessible in multiple ways including a first way and a second way, and the associative entries include single size items and double size items. The method is further carried out by storing in a second memory bank a stash of associative entries, receiving a sequence of data items, extracting a search key from each of the data items, applying first and second hash functions to the search key to generate first and second indices, reading the associative entries in the hash tables that are indicated respectively by the first and second indices, matching the search key against the associative entries of the hash tables in all the ways, and upon finding a match between the search key and the respective entry key in an indicated associative entry, outputting the respective value from the indicated associative entry. The method is further carried out responsively to the respective value from the indicated associative entry by inserting the associative entries of the stash into the hash tables in accordance with a single size cuckoo hashing insertion procedure and a double size cuckoo hashing insertion procedure for the single size items and the double size items, respectively.

According to yet another aspect of the method, the single size cuckoo hashing insertion procedure for a selected single size item includes conducting a first search of the hash tables for a first position having first and second vacant ways, and when the first search is successful, storing the selected single size item in one of the first and second vacant ways. When the first search is unsuccessful, the single size cuckoo hashing insertion procedure includes conducting a second search of the hash tables for a second position, wherein the first way of the second position is vacant and the second way of the second position is occupied, and when the second search is successful, storing the selected single size item in the first way of the second position.

When the second search is unsuccessful and when a predetermined probability is satisfied, the single size cuckoo hashing insertion procedure includes evicting an occupant of one of the ways of a chosen position of one of the hash tables into the stash and storing the selected single size item in the one way of the chosen position.

When the predetermined probability is not satisfied, the single size cuckoo hashing insertion procedure includes conducting a third search of the hash tables for a third position wherein the first way and the second way of the third position have respective first and second occupying single size items, and when the third search is successful, evicting the first occupying single size item into the stash, and storing the selected single size item in the first way of the third position.

When the third search is unsuccessful, and when space for a double size item is unavailable on the stash, the single size cuckoo hashing insertion procedure includes inserting the selected single size item into the stash.

When space for a double size item is available on the stash, the single size cuckoo hashing insertion procedure includes evicting a double size occupant of a new chosen position of one of the hash tables into the stash, and storing the selected single size item in the new chosen position.

According to yet another aspect of the method, the double size cuckoo hashing insertion procedure for a selected double size item includes iteratively conducting with respective hash composition factors from the first table a first search of the hash tables for a first position having first and second vacant ways, and when the first search is successful, storing the selected double size item in the first and second vacant ways.

When the first search is unsuccessful and when a predetermined probability is satisfied, the double size cuckoo hashing insertion procedure includes evicting occupants of a chosen position of one of the hash tables into the stash, and storing the selected double size item in the first way and the second way of the chosen position.

When the predetermined probability is not satisfied, the double size cuckoo hashing insertion procedure includes iteratively conducting a second search of the hash tables for a second position wherein the first way of the second position is vacant and the second way of the second position is occupied by a single size item, and when an iteration of the second search is successful, evicting the occupying single size item into the stash and storing the selected double size item in the second position.

When the iterations of the second search are unsuccessful, the double size cuckoo hashing insertion procedure includes conducting a third search of the hash tables for a third position occupied by a double size item, and when the third search is successful evicting the occupying double size item and storing the selected double size item in the third position.

When the third search is unsuccessful, the double size cuckoo hashing insertion procedure includes evicting occupants of a new chosen position of one of the hash tables into the stash, and storing the selected double size item in the new chosen position.

There is further provided according to embodiments of the invention a computer software product, including a non-transitory computer-readable storage medium in which computer program instructions are stored, which instructions, when executed by a computer, cause the computer to execute a method, which is carried out by storing in a first memory bank a plurality of hash tables of associative entries including a respective entry key and a respective value. The hash tables are accessible in multiple ways including a first way and a second way. The associative entries include single size items and double size items. The method is further carried out by storing a stash of associative entries in a second memory bank, receiving a sequence of data items, extracting a search key from each of the data items, applying first and second hash functions to the search key to generate first and second indices, reading the associative entries in the hash tables that are indicated respectively by the first and second indices, matching the search key against the associative entries of the hash tables in all the ways, and finding a match between the search key and the respective entry key in an indicated associative entry. The method is further carried out by outputting the respective value from the indicated associative entry, and responsively to the respective value from the indicated associative entry inserting the associative entries of the stash into the hash tables in accordance with a single size cuckoo hashing insertion procedure and a double size cuckoo hashing insertion procedure for the single size items and the double size items, respectively.

According to an aspect of the computer software product, the single size cuckoo hashing insertion procedure for a selected single size item includes conducting a first search of the hash tables for a first position having first and second vacant ways, and when the first search is successful, storing the selected single size item in one of the first and second vacant ways.

When the first search is unsuccessful, the single size cuckoo hashing insertion procedure includes conducting a second search of the hash tables for a second position, wherein the first way of the second position is vacant and the second way of the second position is occupied, and when the second search is successful, storing the selected single size item in the first way of the second position.

When the second search is unsuccessful and when a predetermined probability is satisfied, the single size cuckoo hashing insertion procedure includes evicting an occupant of one of the ways of a chosen position of one of the hash tables into the stash and storing the selected single size item in the one way of the chosen position.

When the predetermined probability is not satisfied, the single size cuckoo hashing insertion procedure includes conducting a third search of the hash tables for a third position, wherein the first way and the second way of the third position have respective first and second occupying single size items, and when the third search is successful, evicting the first occupying single size item into the stash, and storing the selected single size item in the first way of the third position.

When the third search is unsuccessful, the instructions cause the computer to perform the additional steps of: when space for a double size item is unavailable on the stash inserting the selected single size item into the stash; and when space for a double size item is available on the stash, evicting a double size occupant of a new chosen position of one of the hash tables into the stash, and storing the selected single size item in the new chosen position.

According to still another aspect of the computer software product, the double size cuckoo hashing insertion procedure for a selected double size item includes conducting a first search of the hash tables for a first position having first and second vacant ways, and when the first search is successful, storing the selected double size item in the first and second vacant ways.

When the first search is unsuccessful and when a predetermined probability is satisfied, the double size cuckoo hashing insertion procedure includes evicting occupants of a chosen position of one of the hash tables into the stash, and storing the selected double size item in the first way and the second way of the chosen position.

When the predetermined probability is not satisfied, the double size cuckoo hashing insertion procedure includes conducting a second search of the hash tables for a second position, wherein the first way of the second position is vacant and the second way of the second position has an occupying single size item, and when the second search is successful, evicting the occupying single size item into the stash and storing the selected double size item in the second position.

When the second search is unsuccessful, the double size cuckoo hashing insertion procedure includes conducting a third search of the hash tables for a third position occupied by a double size item, and when the third search is successful evicting the occupying double size item and storing the selected double size item in the third position.

When the third search is unsuccessful, the double size cuckoo hashing insertion procedure includes evicting occupants of a new chosen position of one of the hash tables into the stash, and storing the selected double size item in the new chosen position.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

System Architecture

Figure 1:
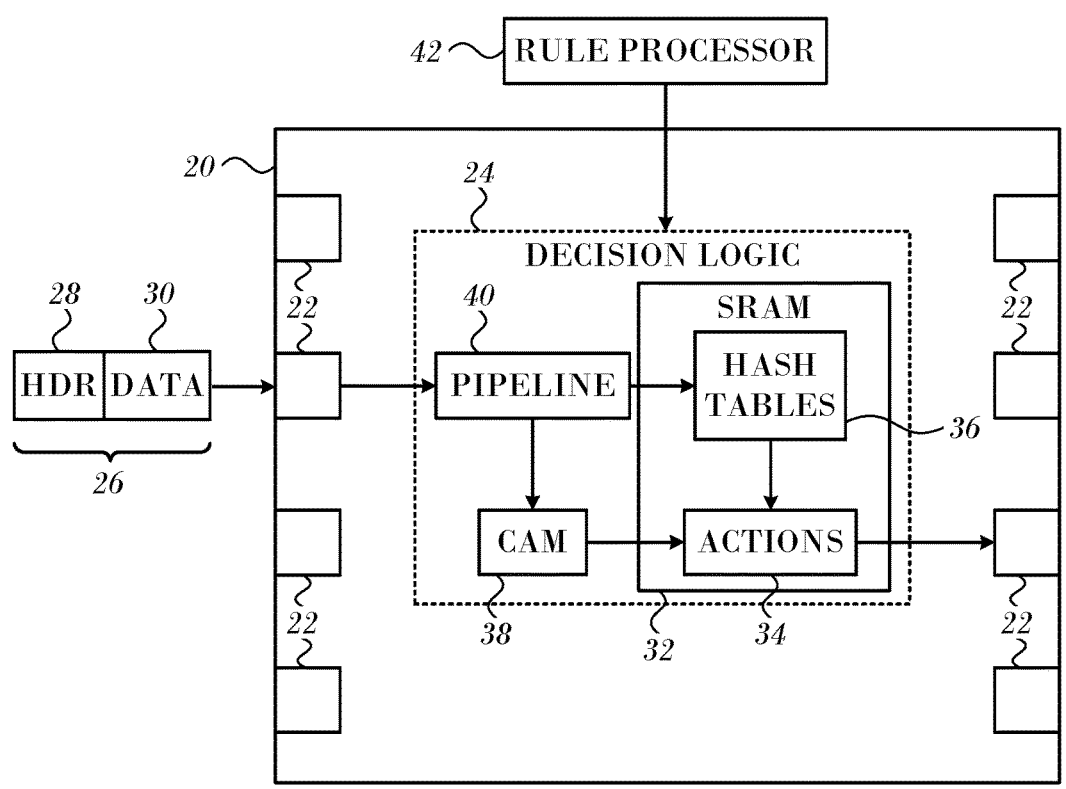
FIG. 1 is a block diagram that schematically illustrates a packet switch, in accordance with an embodiment of the invention.

Turning now to the drawings, reference is initially made to FIG. 1, which is a block diagram that schematically illustrates a network element 20, which operates as packet decision and forwarding apparatus in accordance with an embodiment of the invention. Network element 20 can be configured as a network bridge or router, for example, with multiple ports 22 connected to a packet communication network. Decision logic 24 within network element 20 forwards data packets 26 between ports 22, and may also perform other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual decision functions of decision logic 24.

In the pictured embodiment, decision logic 24 receives packets 26, each containing a header 28 and payload data 30. A processing pipeline 40 in decision logic 24 extracts a search key from each packet 26, typically (although not necessarily) including the contents of certain fields of header 28. For example, the key may comprise the source and destination addresses and ports and a protocol identifier. Pipeline 40 matches the key against hash tables 36 containing a set of associative entries, which are stored in a memory, such as a static random access memory (SRAM 32) in network element 20, as described in detail hereinbelow. SRAM 32 also contains a list of actions 34 to be performed when a key is found to match one of the rule entries. For this purpose, each entry in hash tables 36 typically contains a pointer to the particular action that decision logic 24 is to apply to packets 26 in case of a match. Hash tables 36 may be used, inter alia, in applying packet classification rules.

In addition, decision logic 24 typically comprises a content-addressable memory (CAM 38), which contains associative entries that have not been incorporated into hash tables 36 in SRAM 32. CAM 38, sometimes referred to herein as a "stash" or "spillover stash", may contain, for example, entries that have recently been added to network element 20 and not yet incorporated into the data structure of hash tables 36, and/or entries that were ejected from their slots in hash tables 36 and for which a new slot was not found within a predefined timeout period. The entries in CAM 38 likewise point to corresponding actions 34 in SRAM 32. Pipeline 40 may match the classification keys of all incoming packets 26 against both hash tables 36 in SRAM 32 and CAM 38. Alternatively, CAM 38 may be addressed only if a given classification key does not match any of the entries in hash tables 36. It is advantageous that the hash tables 36 are accessible in multiple ways, i.e., multiple entries per index, for example, two ways per table. For convenience, the term "way" may refer to the content of an entry in the hash tables as well as an access to that entry.

Pipeline 40 typically comprises dedicated or programmable hardware logic, which is configured to carry out the functions described herein. Pipeline 40 typically also contains at least one bank of dedicated memory for implementation of the table of hash composition factors that is described below. For example, pipeline 40 may comprise a suitable application-specific integrated circuit (ASIC). Alternatively or additionally, at least some of the functions of pipeline 40 may be implemented in a standalone or embedded microprocessor.

In the example shown in FIG. 1, a rule processor 42 is responsible for inserting associate elements received by network element 20 into hash tables 36, using the modified cuckoo hashing insertion procedure that is described herein. Rule processor 42 performs its functions under the control of software instructions, which are typically stored in tangible, non-transitory computer-readable storage media, such as electronic, optical, or magnetic memory media. Rule processor 42 may be integrated into network element 20, or it may be implemented as a separate, offline component.

Figure 2:
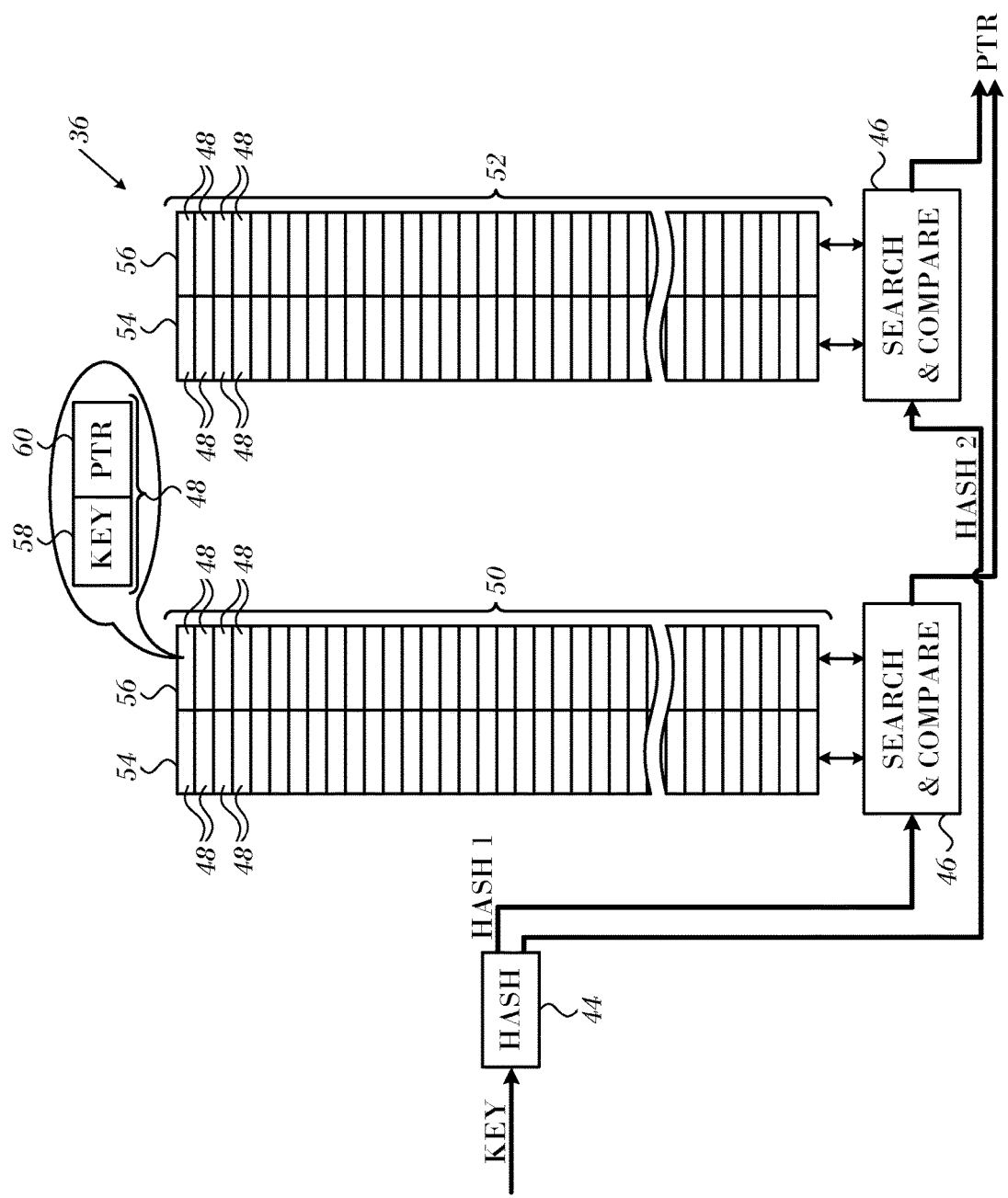
FIG. 2 is a block diagram that schematically illustrates hashing circuits and tables in accordance with an embodiment of the invention.

Reference is now made to FIG. 2, which is a block diagram that schematically illustrates hashing circuits and tables in pipeline 40 and SRAM 32 (FIG. 1), in accordance with an embodiment of the invention. Pipeline 40 extracts a search key, x, from each incoming packet 26.

Hash circuit 44 applies two different hash functions $h_1$ and $h_2$ to the search key x, and computes two indices, $h_1(x)$ and $h_2(x)$ (shown in the figure as HASH1 and HASH2). The Robert Sedgwicks and Justin Sobel hash functions, as defined in the above-mentioned partow.net Web site can be used. Alternatively, substantially any uncorrelated pair of suitable hash functions may be used.

Additional lookup circuits 46 use the indices $h_1(x)$ and $h_2(x)$ to read corresponding entries 48 from tables 50, 52, which make up hash tables 36 in SRAM 32. In the pictured example, each of tables 50, 52 comprises two ways 54, 56. Each entry 48 in each of the ways comprises an entry key 58 and a pointer value 60. For example, each of the ways 54, 56 in each of tables 50, 52 may comprise 8K entries 48, with 128 bits in each entry. Alternatively, larger or smaller entries and tables may be used.

Lookup circuits 46 compare the search key x to entry key 58 in each of the entries indicated by $h_1(x)$ and $h_2(x)$ in tables 50, 52. Upon finding a match between the search key and the respective entry key in an indicated entry 48, circuits 46 output pointer value 60 from the indicated entry. Typically, decision logic 24 uses the pointer value 60 to select one of actions 34, and then handles the corresponding packet accordingly.

Insertions.

The benefits of the insertion algorithms described below can be appreciated by simulation, which can be accomplished by those skilled in the art. The relevant parameters are:

Number of hash tables (d).
Number of ways (b).
Size of the cuckoo hash tables (total sum of all tables) (m).
Size of the items (w).
Size of the spillover CAM or stash (st) (in number of double size items).
Number of movements between insertions of new elements: (maxm).

As noted above, cuckoo hashing is an efficient technique that can be used to perform exact matching of a given item to a set of stored items. It allows the movement of previously stored items when inserting new ones. This simple change has a large effect on the maximum table occupancy that can be achieved.

Figure 3:
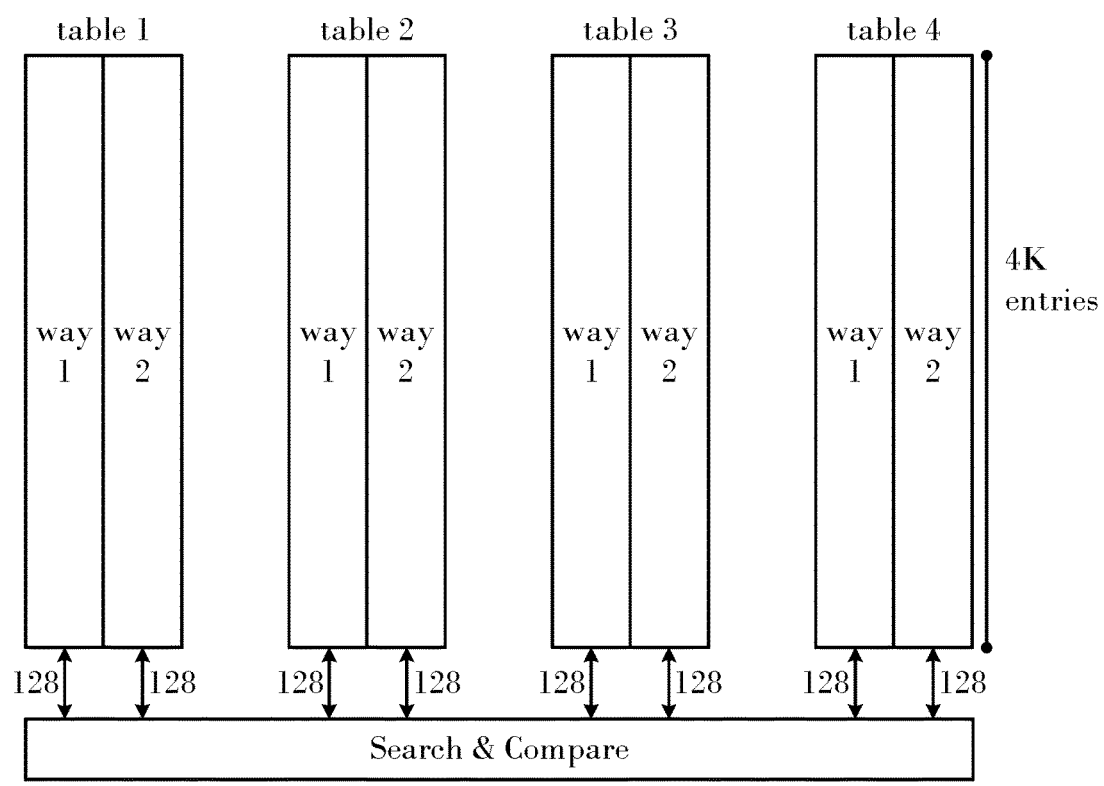
FIG. 3 is a diagram illustrating one example of a parallel cuckoo hash implementation in which insertions can be accomplished in accordance with an embodiment of the invention.

Cuckoo hash uses multiple tables and each one is accessed using a different hash function. The tables can be stored in a single memory such that tables are accessed sequentially or in different memories so that searches can be done in parallel. Reference is now made to FIG. 3, which is a diagram illustrating one example of a parallel cuckoo hash implementation in which insertions can be accomplished in accordance with an embodiment of the invention.

In the example of FIG. 3, four tables are used. Each one is mapped to a memory and each table has two ways. The items stored in the table have 128 bits. In addition to a key, the entries may include metadata to use in case of a match in order to determine which action to take. Four hash functions $h_1$, $h_2$, $h_3$, $h_4$ are used to access tables 1-4, respectively. To search for an item x, four 256 bits of memory accesses to position $h_1(x)$ on table 1, $h_2(x)$ on table 2, and so on are needed. To insert items the same hash functions are used and if all four positions are occupied, then one of the items y stored in those positions is removed and another item x is inserted there. After that the item y is attempted to be inserted, and the process is repeated until insertion succeeds or a maximum number of tries has occurred. For the configuration shown in the diagram an occupancy (defined as utilization at first miss) close to 100% is achieved.

In many implementations, search operations are performed during an insertion (as the insertions can take hundreds of cycles). In that situation, it must be ensured that during element movements ongoing search operations also find the element being moved. To that end, a register can be used to store the element such that the register is also compared with the searched key. In many cuckoo implementations, instead of a single register, a stash, e.g., CAM 38 (FIG. 1) can be implemented as a small set of registers. The stash has some additional benefits: it increases the worst case occupancy and can also buffer insertions when they occur close in time. Additionally it may store entries resulting from an "avalanche", wherein more entries are evicted than inserted during a cuckoo insertion process.

A cuckoo hash that stores elements of size w bits can also be used for items of smaller sizes, but that, as noted above, obviously reduces the occupancy of the tables. Supporting multiple sizes is not trivial. For example, when an item with size w/2 bits is stored in a word of w bits, depending on how the remaining bits are set, the item could be the same as an item with w bits. Focusing on the case of two sizes w and w/2 bits, one option is to add a key type bit to each position on the tables to indicate if a w bit item or a w/2 bit item is stored there. This works, but again the table occupancy is reduced because items of size w/2 bits preempt w bits.

Single/Double Configuration.

For a two way cuckoo hash implementation such as the one shown in FIG. 3, there is a second configuration, referred to herein as the "single/double" configuration that supports items of size w bits (single size items) and size 2 w bits (double size items). For each table and position a bit can be added to mark if a double size item is stored there. With this configuration, single- and double size items can be supported simultaneously. In this scheme it is still possible to achieve good occupancy as two single size items can be also stored in a position (one on each way). The same single/double configuration should also be used for the stash, which is now composed of two-way elements that can hold two single size items or a double size item.

In the single/double configuration, there are several new situations that can occur in an insertion operation. For example, when inserting a single size item $x_s$, it may happen that positions $h_1(x_s)$ on table 1, $h_2(x_s)$ on table 2, $h_3(x_s)$ on table 3 and $h_4(x_s)$ on table 4 are all filled with double size items. In this situation a cuckoo movement needs to displace a double size item $y_d$ that requires space in the stash. This means that during an insertion the stash usage can grow. This cannot happen in a traditional cuckoo hash implementation and therefore represents a significant difference that must be taken into consideration.

A sequence of operations that can create an increase in the stash usage, i.e., an avalanche, during an insertion is as follows:

1. A single size item causes eviction of a double size item onto the stash (increasing stash usage by one single size item).
2. The double size item can only move pairs of single size items, so that two single size items are placed in the stash (no net increase in stash usage).
3. A selected single size item can only move double size items, so that a double size item is placed on the stash (increasing stash usage by one single size item) and so on.

Although the probability of an occurrence of this sequence is low, its impact on the required stash size should be evaluated. It should be noted that the stash size is critical. Too large a stash imposes a penalty in that the stash itself must be searched. The algorithms disclosed herein generally have been designed to minimize the size of the stash and the probability of an avalanche.

Another situation arises when a double size item can only move pairs of single size items. In that case, although the stash usage does not increase, the number of elements in the stash does. Moreover, it is clear that when inserting an item, finding a place for a double size item will be harder. The same applies to cuckoo movements: displacing a pair of single size items or a double size item is more difficult than moving a single size item. From this discussion, it becomes apparent that selecting an insertion algorithm for a single/double cuckoo hash is far from trivial.

The single/double scheme just described can be combined with preprocessing-enhanced cuckoo hash, described below in the discussion of FIG. 8. In that embodiment, the number of tables is reduced and a preprocessing table is added to achieve good occupancy.

Continuing to refer to FIG. 3, in the single/double configuration the search for an item x is similar to traditional cuckoo hash and works as follows: The positions $h_1(x)$ on table 1, $h_2(x)$ on table 2, $h_3(x)$ on table 3 and $h_4(x)$ on table 4 are accessed and the key type bit is checked to see if the stored items are of the same type as that of the item x, i.e., single- or double-size. If so the stored items are compared and if equal a match is returned.

Removal of item x in the single/double configuration is nearly the same as its search, except once found the item is removed and the key type bit updated accordingly.

Insertion of an item is by far the most complex operation in the single/double configuration. Consideration of some choices that can be made during an insertion follow.

Free space selection: when placing a single size item in a position on a table, there are two options: a) place it in a position in which there is a single size item in the other way or b) place it on a position on which the other way is free. The first option is referred to as "placement in pairs" and the second option is termed "placement alone". When inserting an item, if both options are available, different policies could be applied to choose between them: "random", "place in pairs" and "place alone". The option "place alone" was found to be the best.

Eviction policy: when a cuckoo movement is needed during an insertion, there are five possible situations. Two correspond to the case in which the element that causes the movement is a single size item and three to the case in which the movement was caused by a double size item.

For the single size item-induced movement, the possibilities are: a) move a single size item and b) move a double size item. If both choices are available, moving a single size item seems intuitively the best choice.

For the double size item-induced movement, the possibilities are: a) move a single, b) move a double and c) move a pair. When all three are available, moving a single size item seems the best choice. The order of preference among the remaining two possibilities is not evident.

Another issue that arises during insertion concerns pending items. To support those items a spillover stash may be established. In one implementation the spillover stash may be a dedicated memory allocation. Alternatively, the spillover stash may be shared with the stash that is used to improve worst case table occupancy and deal with worst case insertion time. With the alternative option failure will occur when the combined stash overflows. Nevertheless, a shared stash is preferable to two independent stashes. For example, assume that independent stashes are used and each stash has st positions. Failure occurs when st insertions fail or when an insertion requires more than st pending items. Instead, if a single stash with capacity 2*st is used, more than st insertion failures can be supported. Also if at some point the failure occurs when there are fewer than st pending items, then it is because there are more than st previous insertion failures. In such case failure would have certainly occurred before with separate smaller stashes. As with an ordinary stash, the spillover stash is formed by entries that can accommodate both double size items and two single size items.

Single Size Item Insertion.

Figure 4:
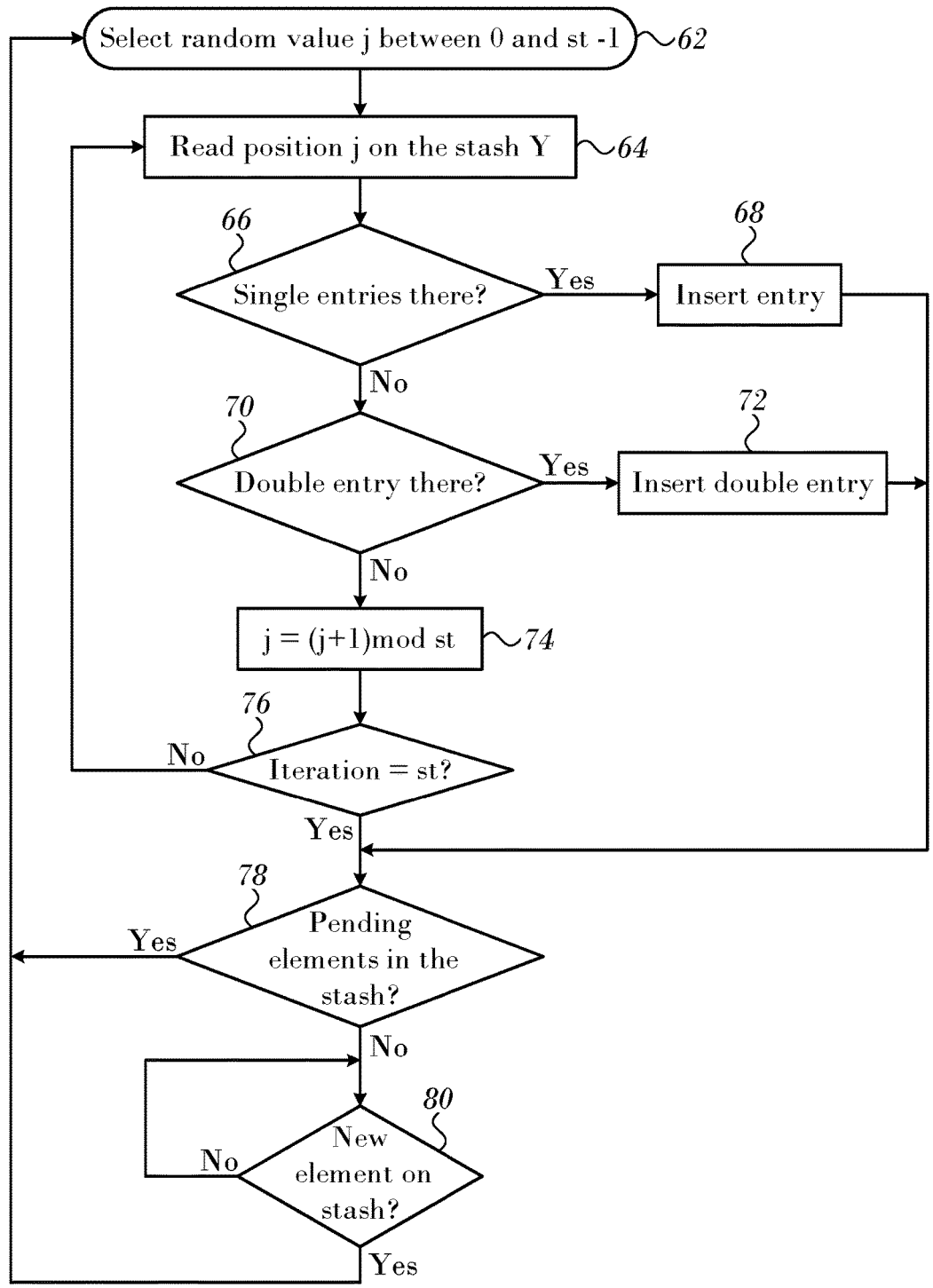
FIG. 4 is a flow chart of an insertion algorithm in a hash table in accordance with an embodiment of the invention.

Reference is now made to FIG. 4, which is a flow chart of an insertion algorithm in a hash table in accordance with an embodiment of the invention. The process steps are shown in a particular linear sequence in FIG. 4 and the other flow charts herein for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process shown.

The insertion algorithm typically executes as a background task that continuously takes elements from the stash and tries to place them in the tables. In initial step 62 and step 64 an element is randomly chosen for insertion from the entries in the stash (it can be either a single size item or a double size item). Then the insertion algorithm is applied to the selected element. The insertion on the stash searches for the first entry available in which the current element can be placed. However, in a naïve insertion procedure, it is possible that single elements can be placed such that there is no empty place for a new double element. To avoid this issue, before inserting a double element, the stash is defragmented such. (1) a single entry always occupies a single place in the stash and (2) all empty entries are grouped such that if there are two empty single entries then a double size item can use them.

At decision step 66 it is determined if a single size item is found at the selected position. If the decision at decision step 66 is affirmative then at step 68 the single size item is inserted.

If the decision at decision step 66 is negative then at decision step 70 it is determined if a double size item is found at the selected position. If the decision at decision step 70 is affirmative then at step 72 the double size item is inserted.

If the decision at decision step 70 is negative then a counter is incremented at step 74. Then at decision step 76 it is determined if st iterations of the loop beginning at step 64 have occurred. If not, the counter is incremented and control returns to step 64.

If the decision at decision step 76 is affirmative, or after performing step 68 or step 72 then at decision step 78 it is determined if pending elements remain in the stash. If so then control returns to initial step 62 to iterate the process. Otherwise control proceeds to delay step 80 to await the appearance of new elements on the stash, after which control returns to initial step 62.

Figure 5:
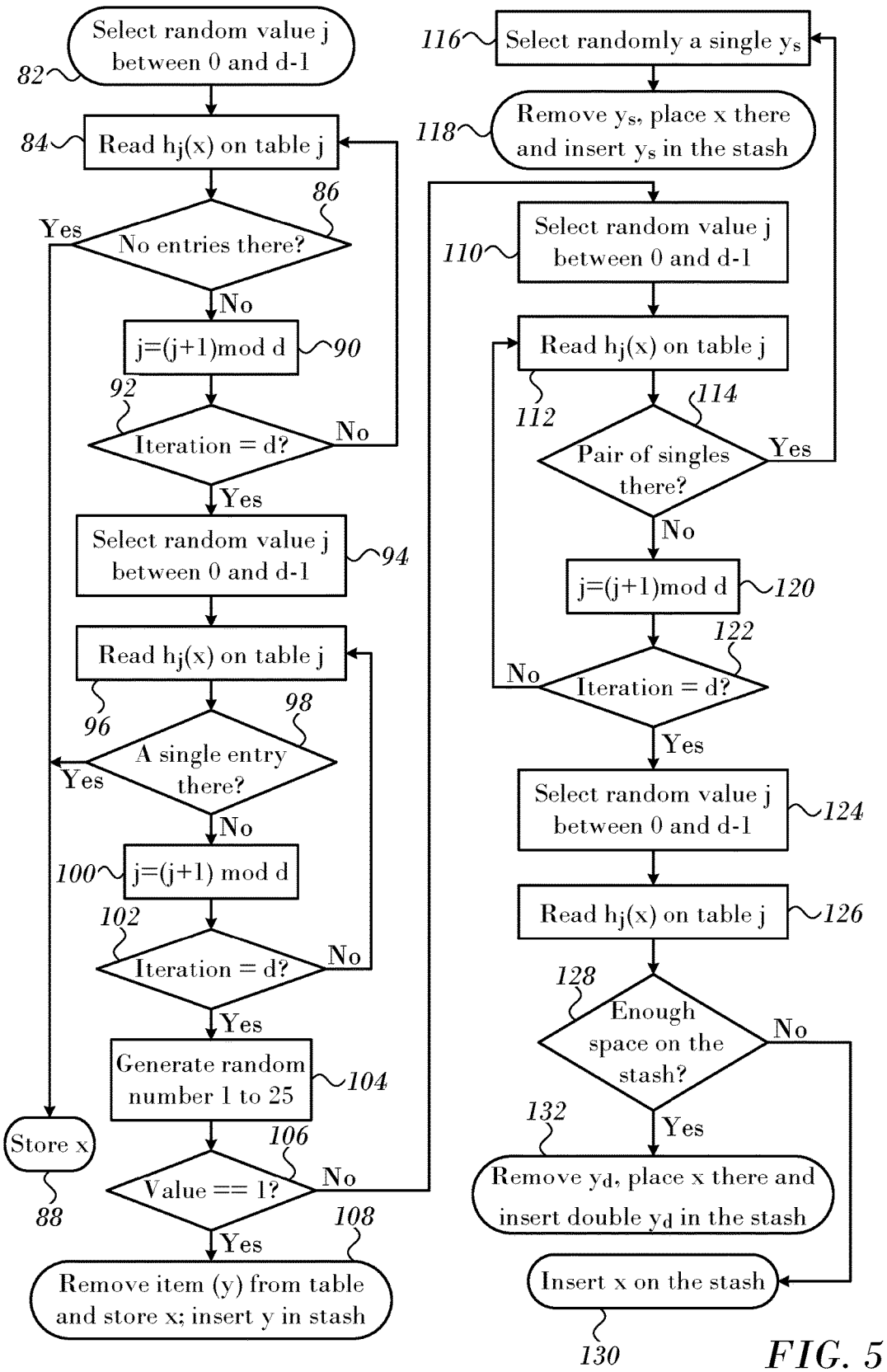
FIG. 5 is a flow chart showing insertion of single size items in a hash table in accordance with an embodiment of the invention.

The insertion algorithm performed in steps 68, 72 for single size items and double size items, respectively differ. Reference is now made to FIG. 5, which is a detailed flow chart of the insertion of single size items in step 68 in accordance with an embodiment of the invention. The variable d represents the number of hash tables.

The process starts by selecting a random table j in initial step 82, where a number j between 0 and d−1 is chosen randomly. A position $h_j(x)$ is read from table j in step 84.

Next, at decision step 86, it is determined if the two ways at the selected position are empty. If the determination at decision step 86 is affirmative, then control proceeds to final step 88. The single size item is stored at the selected position and the insertion ends.

If the determination at decision step 86 is negative, then control proceeds to step 90. At least one of the ways is occupied. A counter j is incremented modulo d. At decision step 92 it is determined if d iterations of step 90 have occurred. If the decision at decision step 92 is negative then control returns to step 84 to read a value from the next hash table to try find two empty ways.

If the decision at decision step 92 is affirmative then in a second phase a search begins for entries in the hash tables having one way containing a single size item and one empty way.

At step 94 a number j between 0 and d−1 is chosen randomly. A position $h_j(x)$ is read from table j in step 96.

Next, at decision step 98, it is determined if a single size item is stored in one of the ways at the selected position and the other way is empty. If the determination at decision step 98 is affirmative, then control proceeds to final step 88 and the entry is stored in the empty way.

If the determination at decision step 98 is negative, then control proceeds to step 100. The counter j is incremented modulo d. At decision step 102 it is determined if d iterations of step 100 have occurred. If the decision at decision step 102 is negative then control returns to step 96 to read a value from the next hash table.

If the decision at decision step 102 is affirmative then in a third phase a method for a cuckoo movement is selected. In most cases, the item to be moved will be selected according to a priority process. However, with a small probability (typically 1/25) the item is selected randomly. This is done to avoid loops as will be discussed below. At step 104 an integer ranging from 1 to 25 is generated randomly. The probability may be adjusted by the user if desired by varying the range of the randomly generated integer.

Next, at decision step 106, it is determined if the integer has the value 1. If the determination at decision step 106 is affirmative, then control proceeds to final step 108. The entry occupying the position $h_j(x)$ is evicted and inserted on the spillover stash. The single size item x is stored. In the case where two single size items are stored at the position $h_j(x)$, one of them is selected at random for eviction and replacement by the item x.

If the determination at decision step 106 is negative (the most likely outcome), then control proceeds to step 110. This phase begins by examining position $h_j(x)$ to see if it contains two single size items. A value for the counter j ranging from 0 to d−1 is generated randomly. In the event of a conflict with the current value of the counter j, the next value (modulo d) is assigned to the counter j. Next a position $h_j(x)$ is read from table j in step 112.

Next, at decision step 114, it is determined if a pair of single size items are stored at the position $h_j(x)$. If the determination at decision step 114 is affirmative, then control proceeds to step 116. A cuckoo move is executed. One of the single size items is selected at random. Then at final step 118 the single size item selected in step 116 is evicted and inserted on the spillover stash. The item x is stored in its place at the position $h_j(x)$.

If the determination at decision step 114 is negative, then control proceeds to step 120. The counter j is incremented modulo d. At decision step 122 it is determined if d iterations of step 120 have occurred. If the determination at decision step 122 is negative then control returns to step 112 to read a value from the next hash table.

If the determination at decision step 114 is affirmative, the search for pairs has failed. In a final phase a hash table is randomly selected. At step 124 a random value for the integer j ranging from 0 to d−1 is generated randomly. At step 126 the position $h_j(x)$ is read from table j. The position $h_j(x)$ must store a double size item $y_d$, otherwise, the position would have been selected in a previous phase. A cuckoo move is now attempted to be performed. At decision step 128 it is determined if there is sufficient space on the spillover stash to contain the double size item $y_d$.

If the determination at decision step 128 is negative, then the single size item x is stored on the spillover stash at final step 130.

If the determination at decision step 128 is affirmative, then at final step 132 the double size item $y_d$ is evicted from the position $h_j(x)$ and the single size item x stored in the hash table at the now available the position $h_j(x)$. The evicted double size item $y_d$ is inserted into the stash. Final step 132 is the least preferable option in the algorithm and only occurs when there is sufficient space in the spillover stash as we are removing a single size item and adding a double size item to the stash. As described above, the algorithm tries to place single items into the spillover stash when possible.

The algorithm of FIG. 5 can be implemented by reading all the positions $h_j(x)$ on the tables only once, saving the types of the items stored in each of them and then applying the algorithm. Moreover, as noted above, Cuckoo movements cannot select the table from which the item was removed in the last movement. This is also to avoid loops caused by the priority selection process. For example, if there are three single size items that map to the same position on table $t_a$ and double size items in the rest of the tables, the process will repeatedly attempt to place the three single size items in the two ways of the table $t_a$. The random selection of a table (step 104, decision step 106; final step 108) has been introduced in order to interrupt such loops. There are more complex loops that can be caused by the priority process. It may be observed that since items are placed in the spillover stash, the last movement for that item should be memorized, so that when trying insertion again, the last movement of that item can be reversed, and it can be assured that in steps 110, 124 the value of j does not repeat its value in the previous iteration. This requires two additional bits per entry of a single size item in the spillover stash.

Double Size Item Insertion.

Figure 6:
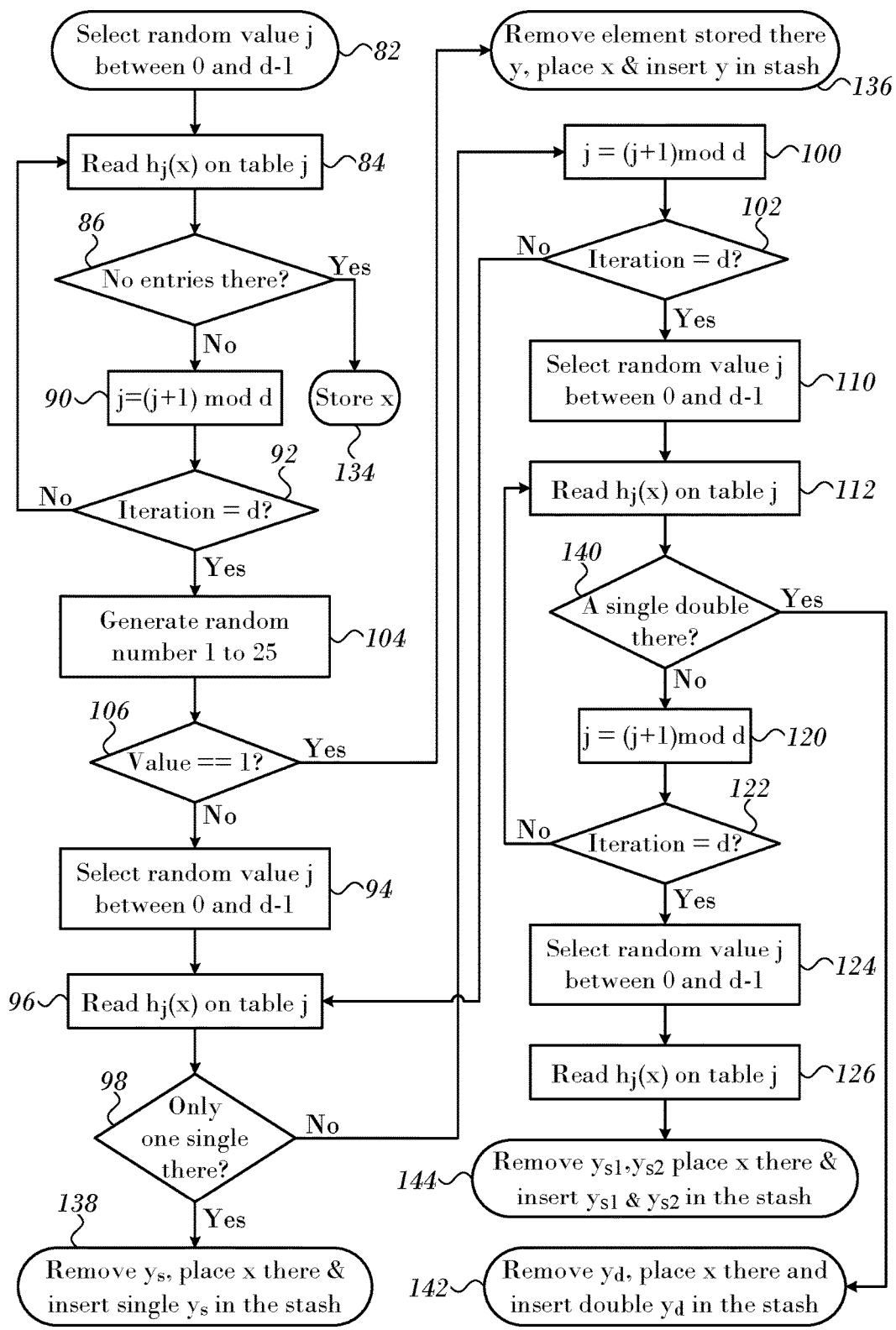
FIG. 6 is a flow chart showing insertion of double size items in a hash table in accordance with an embodiment of the invention.

Reference is now made to FIG. 6, which is a detailed flow chart of the insertion of double size items in step 72 (FIG. 4) in accordance with an embodiment of the invention. The insertion algorithm attempts to place double size items in vacant positions. If this is not possible, the algorithm executes a cuckoo movement evicting in order of preference one single size item, a double size item and finally pairs of single size items.

The variable d represents the number of hash tables. Initial step 82, step 84 and decision step 86 are performed as described in the discussion of FIG. 5.

If the determination at decision step 86 is affirmative, then control proceeds to final step 134. A double size item x is stored at the selected position and the insertion ends.

If the determination at decision step 86 is negative, then step 90 and decision step 92 are performed as described above.

If the determination at decision step 92 is affirmative, then a cuckoo movement may be executed, but with low probability (1/25) as described in the discussion of FIG. 5. Step 104, and decision step 106 are performed as described above.

If the determination at decision step 106 is affirmative, then at final step 136 the entry occupying the position $h_j(x)$ is evicted and inserted on the spillover stash. The double size item x is stored in the position $h_j(x)$.

If the determination at decision step 106 is negative (the most likely outcome), then a search for a single size item is conducted. Step 94 and the loop represented by step 96, decision step 98, step 100 and decision step 102 are performed. If a position with a single size entry is found at decision step 98, i.e., the determination at decision step 98 is affirmative, then the procedure terminates at final step 138. The single size item at the position $h_j(x)$ is evicted and placed on the spillover stash. The double size item x is stored in the position $h_j(x)$.

If the determination at decision step 102 is affirmative, it is concluded that the search for a position with a single size item has failed. The algorithm now attempts to find a position in the hash tables containing a double size item. Steps 110, 112 are performed as described above. Then at decision step 140 it is determined if a double size item occupies the position $h_j(x)$.

If the determination at decision step 140 is affirmative, then at final step 142 the double size item $(y_d)$ is evicted from the position $h_j(x)$ and placed on the spillover stash. The double size item x is stored in the now vacant position $h_j(x)$.

If the determination at decision step 140 is negative, then the remainder of the tables are searched by executing the loop comprising step 120 and decision step 122, returning to step 112 if more tables remain to be evaluated.

If the determination at decision step 122 is affirmative, it is concluded that the search for a position with a double size item has failed. A cuckoo movement will be executed. A position is chosen randomly on the next table. It will be recalled that modular arithmetic is used. So that no conflict with the last cuckoo movement can occur, if the position is equal to the one used in the previous iteration, the next table modulo d is used. Step 124, 126 are performed as described above to select a position $h_j(x)$. Two single size items must be present at the position $h_j(x)$, or else one of the previous searches in the algorithm would have succeeded. Then at final step 144 the two single size items $(y_{s1}, y_{s2})$ are evicted from the position $h_j(x)$ and placed on the spillover stash. The double size item x is stored in the now vacant position $h_j(x)$ and the procedure ends.

As in the algorithm for the insertion of single size items in FIG. 5, it should be noted that an implementation may first read and categorize all the positions $h_j(x)$ on the tables only once. Furthermore, cuckoo movements cannot select the table from which an item was removed in a previous movement. Random selection of a table interrupts undesirable loops (step 104, decision step 106; final step 136).

Figure 7:
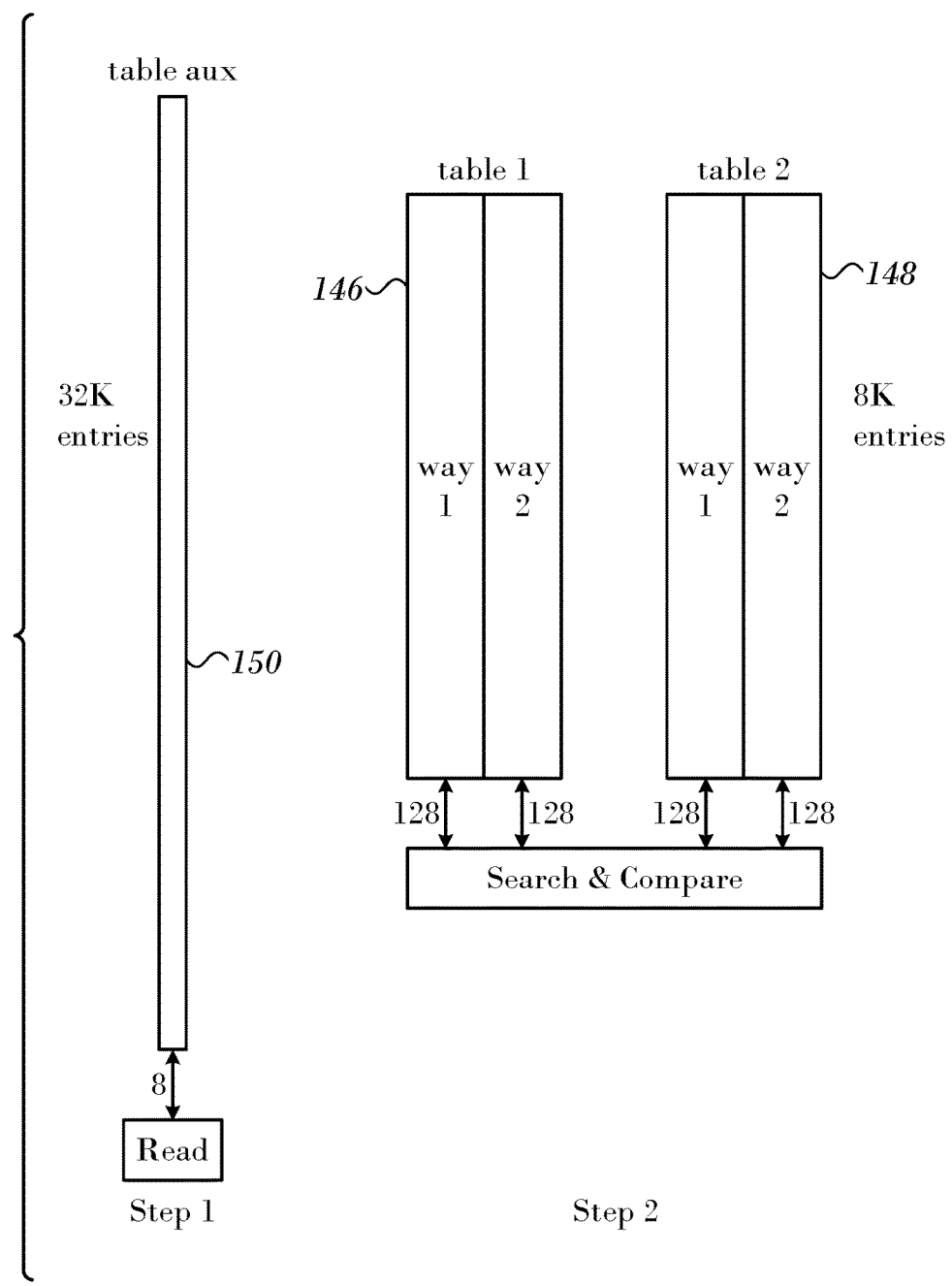
FIG. 7 is a diagram illustrating cuckoo hashing in accordance with an alternative embodiment of the invention.

First Alternate Embodiment in this embodiment preprocessing is used to select the hash function for accessing the hash tables. Reference is now made to FIG. 7, which is a diagram illustrating cuckoo hashing in accordance with an alternative embodiment of the invention. In this case, there are two hash tables 146, 148 and each can store two singles or one double per position. In addition, there is a preprocessing table 150 that is used to select the hash function used to access the other tables. This feature can be used when there are no other elements stored in the tables that mapped to the same position on the preprocessing table. In that case, during the insertion of a single or a double there are additional choices.

Figure 8:
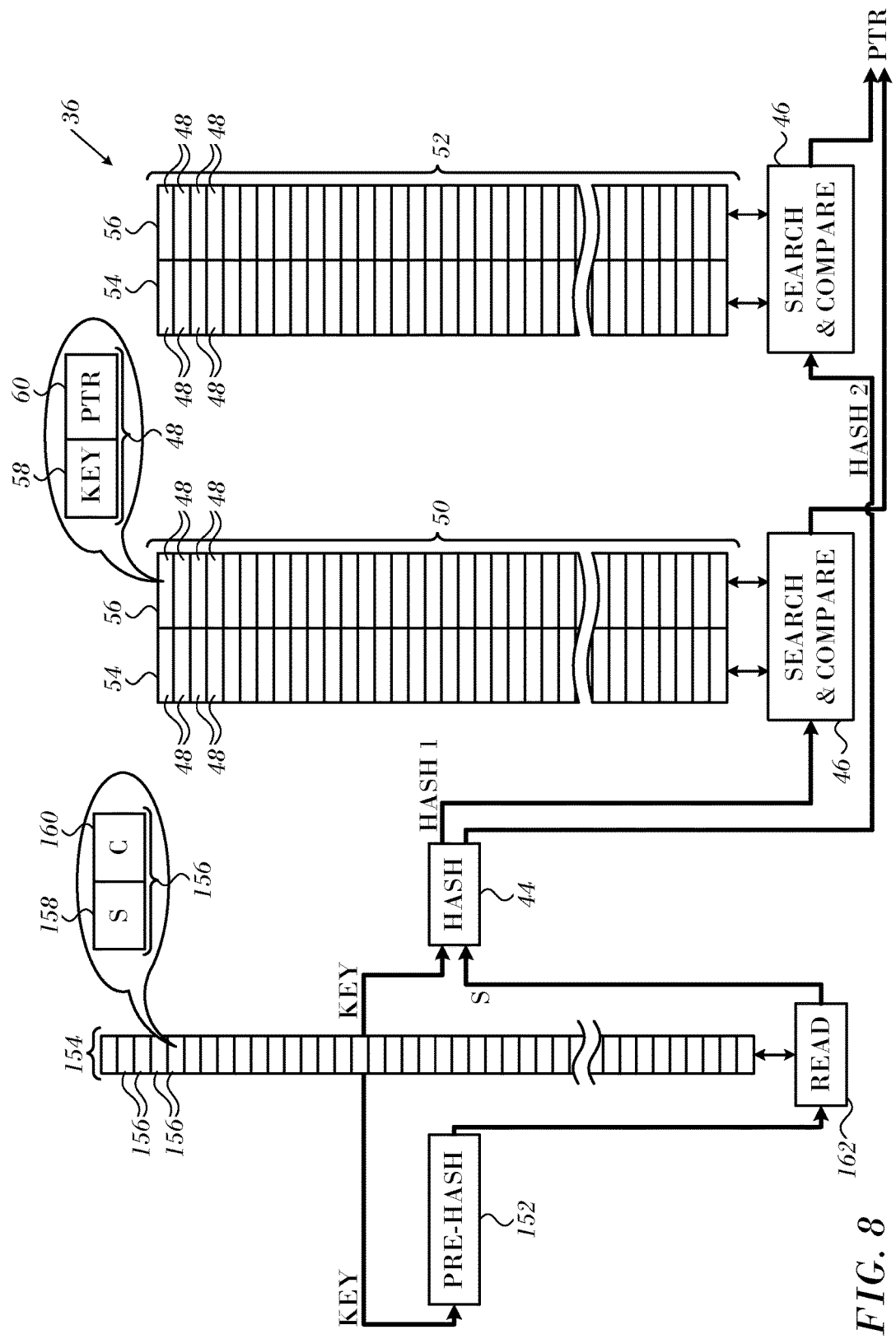
FIG. 8 is a block diagram that schematically illustrates hashing circuits and tables in accordance with an alternative embodiment of the invention.

Reference is now made to FIG. 8, which is a block diagram that schematically illustrates hashing circuits and tables in pipeline 40 and SRAM 32 (FIG. 1), in accordance with the embodiment of the invention shown in FIG. 7. Pipeline 40 extracts a search key x, from each incoming packet 26. In this embodiment a pre-hash circuit 152 applies a suitable hash function to the key, $h_s(x)$, in order to generate an index to an auxiliary hash table 154. Table 154 may be held in SRAM 32 or in a dedicated memory array within the logic pipeline. Pipeline 40 (FIG. 1) extracts a search key, x, from each incoming packet 26.

Hash circuit 44 applies two different hash functions A(x) and B(x) to the search key x, and computes two indices, $h_1(x)$ and $h_2(x)$ (shown in the figure as HASH1 and HASH2), as different combinations of A(x) and B(x). The combinations are determined by the hash composition factor s. For example, the inventors have found it convenient to use indices $h_1(x)=A(x)+2s*B(x)$ and $h_2(x)=A(x)+(2s+1)*B(x)$. (The computations are typically performed in modular arithmetic, for example, modulo m, wherein m is the size of the table.) Substantially any suitable hash functions that are known in the art may be used as A(x) and B(x). For example, A(x) may comprise the sixteen lower bits of a 32-bit cyclic redundancy code (CRC) computed over x, while B(x) comprises the sixteen higher bits. (The 32-bit CRC can be generated by the well-known polynomial $x^{32}+x^{26}+x^{23}+x^{16}+x^{12}+x^{11}+x^{10}+x^8+x^7+x^5+x^4+x^2+x+1$.) As another example, A(x) and B(x) may respectively comprise the Robert Sedgwicks and Justin Sobel hash functions, as defined in the above-mentioned partow.net Web site. Alternatively, substantially any uncorrelated pair of suitable hash functions may be used.

Each entry 156 in table 154 contains a hash composition factor 158, referred to as "s", and a preprocessing counter value 160, labeled "c". In an example embodiment, table 154 contains 32K entries 156, wherein each entry contains seven bits (s=three bits and c=four bits). Alternatively, table structures and entries of different sizes may be used, depending upon application requirements. Counter value 160 is used in construction of hash tables 36, 154, but is not required for table access by pipeline 40. The counter value 160 is initially set to zero in all entries 156 in the table 154, but later is updated. The counter value 160 in any given entry 156 represents a count of entries 48 in tables 50 and 52 that map to that position on table 154. The counter values are not needed for search operations and may therefore be held in a different data structure, separate from table 154, but they are illustrated as a part of entries 156 for the sake of conceptual clarity.

A lookup circuit 162 reads out the value of composition factor 158, s, that is indicated by the hash value $h_s(x)$ calculated by circuit 152 and inputs this value to the hash circuit 44. Otherwise, this embodiment is essentially identical to that of FIG. 2. Further details of the circuitry shown in FIG. 8 are disclosed in commonly assigned copending application Ser. No. 14/846,777, entitled Cuckoo Hashing with Selectable Hash, which is herein incorporated by reference.

The introduction of preprocessing has implications for the insertion algorithm. The preprocessing-enhanced cuckoo hashing adds two new parameters to the standard algorithm: (1) size of the preprocessing table; and number bits in each entry of the preprocessing table for the preprocessing counters.

As in the case of the first embodiment, many different options were tested initially. The results showed that the best option is to place single items in pairs. The preprocessing itself can be exploited at several points during the insertion. When a preprocessing counter (described below) is zero for an item, the different hash sets can be used to search for a place to insert the item and also to select the best option if a movement is needed. In the final algorithm, preprocessing is only used to search for a place to insert the item. This simplifies the algorithm and has a negligible impact on hash table occupancy.

Single Size Item Insertion.

Figure 9:
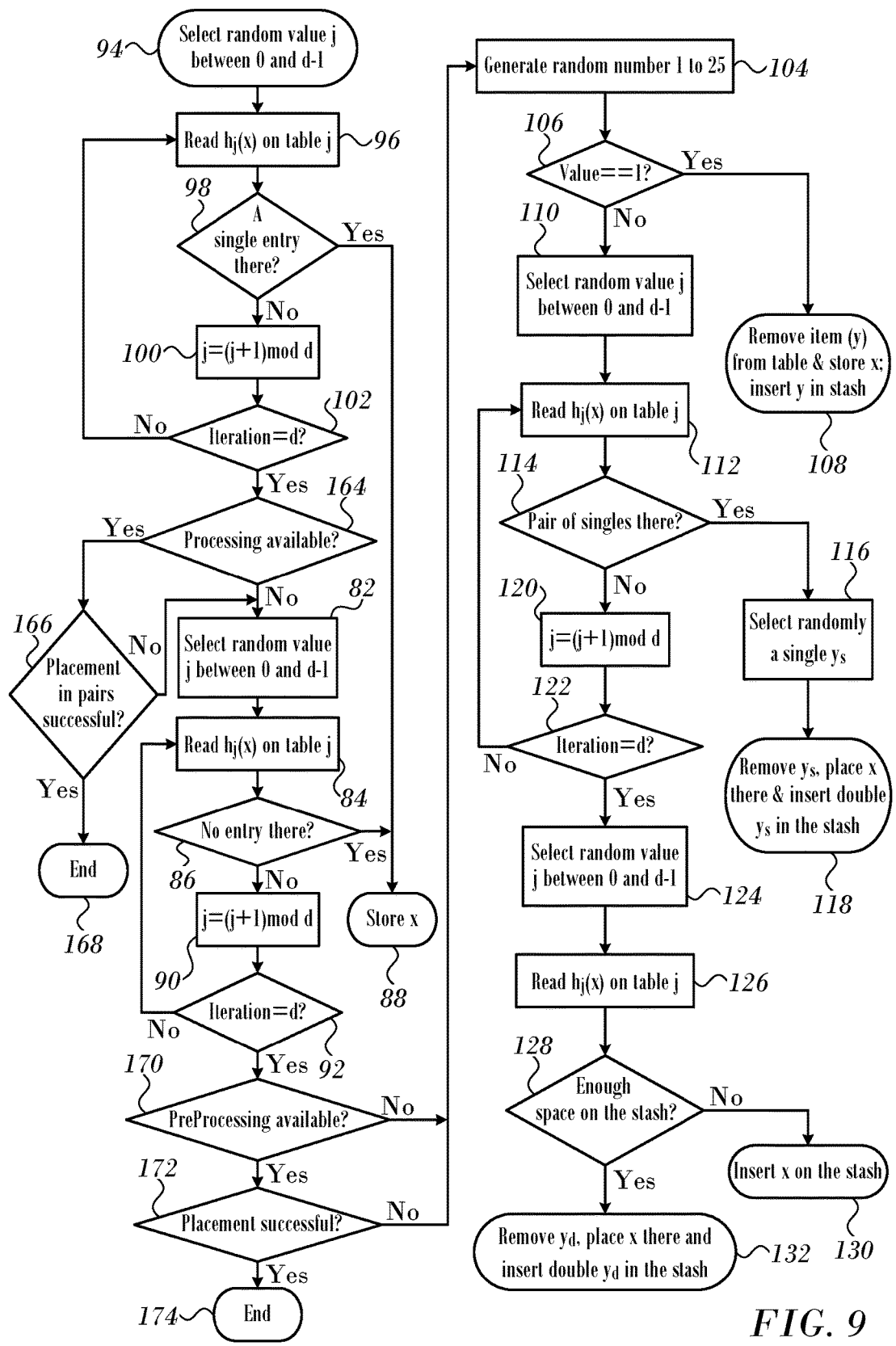
FIG. 9 is a flow chart showing insertion of single size items in a hash table in accordance with an alternative embodiment of the invention.

Reference is now made to FIG. 9, which is a flow chart of an insertion algorithm for a single size item in a hash table in accordance with an alternate embodiment of the invention. The process starts by searching for a position that has a single size item so that the single size item x can be placed on an entry having a single size item by performing a loop (previously described) comprising step 94, 96, decision step 98, step 100 and decision step 102, At decision step 98 it is determined if one single size item is found in one way at the position $h_j(x)$ and the other way is vacant. If so then at final step 88 the single size item x is stored in the available way at the position $h_j(x)$.

If no suitable positions are found, i.e., the determination at decision step 102 is affirmative, then at decision step 164, it is determined if preprocessing is available, i.e., at a current position on preprocessing table 154 (FIG. 8) a preprocessing counter (counter value 160) is zero.

If the determination at decision step 164 is affirmative, then control proceeds to decision step 166 where it is determined if placement in pairs according to a preprocessing procedure (FIG. 10) was successful. If so the procedure ends at final step 168. It should be noted that the preprocessing counter may be incremented during performance of decision step 166, as described below.

If the determination at either of decision steps 164, 166 is negative, then a search is made for a position on the hash table having no entries. Control proceeds returns to a loop (previously described) comprising steps 82, 84, decision step 86, step 90 and decision step 92. If the determination at decision step 86 is affirmative, then at final step 88 the single size item x is stored in the available way at the position $h_j(x)$.

If no empty positions were found, i.e., the determination at decision step 92 was affirmative, then at decision step 170 it is determined if preprocessing is available. Decision step 170 is performed identically to decision step 164.

If the determination at decision step 170 is affirmative, then control proceeds to decision step 172 where it is determined if placement alone, i.e., in an entry of a hash table having both ways vacant, according to a preprocessing procedure was successful. If so the procedure ends at final step 174.

If the determination at either of decision steps 170, 172 is negative, then the random priority procedure comprising step 104, decision step 106 is performed. If the determination at decision step 106 is affirmative then at final step 108 the entry occupying the position $h_j(x)$ is evicted and inserted on the spillover stash. The single size item x is stored.

If the determination at decision step 106 is negative, then the remainder of the method, continuing with step 110, is performed in the same manner as when preprocessing is not used, as described with respect to FIG. 5. For efficiency of implementation, it may be more desirable to first scan all the positions, log the results and then select the position to insert the item or the item to be moved.

Figure 10:
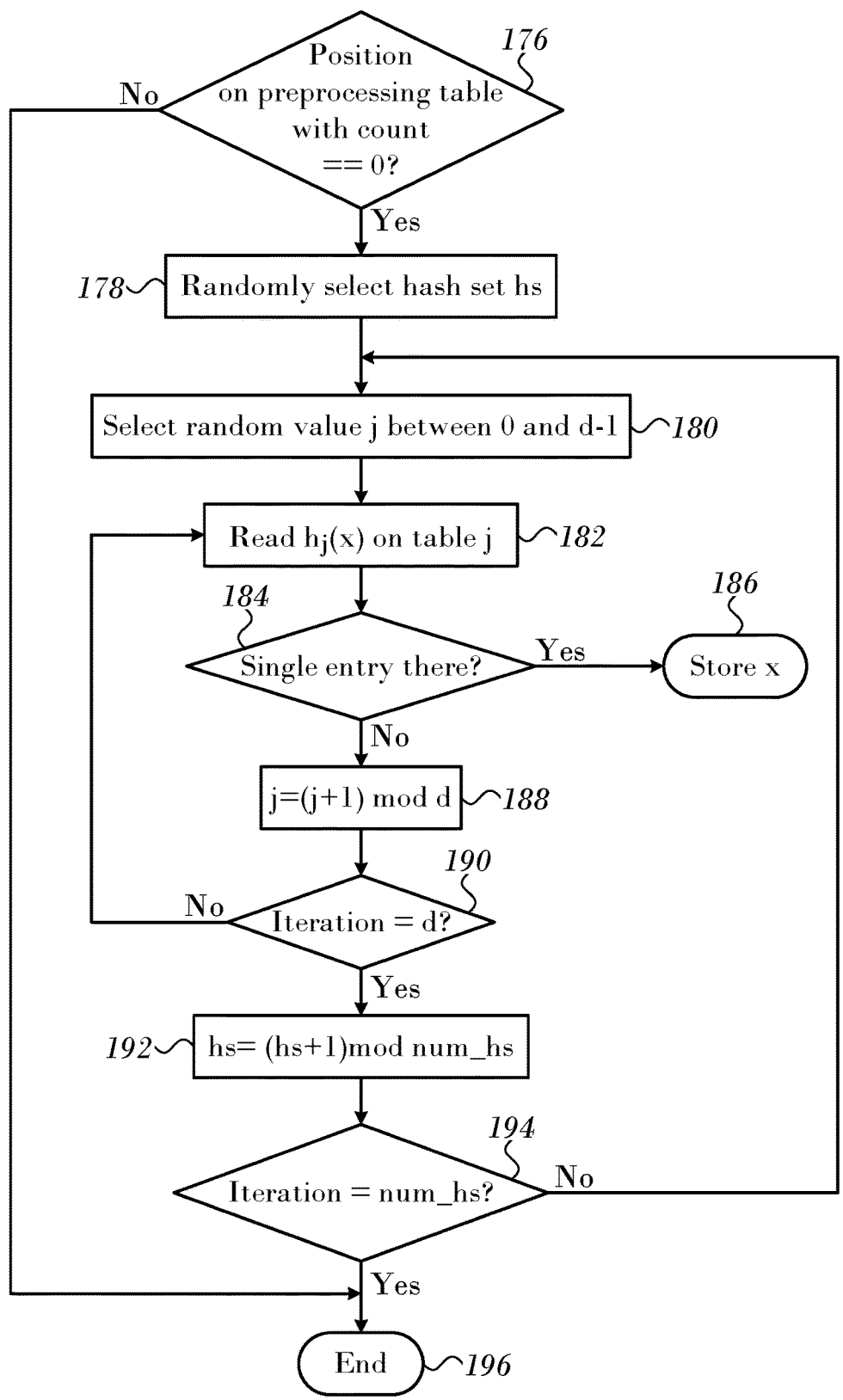
FIG. 10 is a detailed flow chart of a method of searching for an entry having exactly one single size item in a hash table in accordance with an alternative embodiment of the invention.

Reference is now made to FIG. 10, which is a detailed flow chart of a method of searching for an entry having exactly one single size item in a hash table to store another single size item x therein in accordance with an embodiment of the invention. This method may be used to perform decision steps 164, 166 (FIG. 9).

The method begins with decision step 176, which corresponds to decision step 164 (FIG. 9). The preprocessing counter in the current entry of preprocessing table 154 (FIG. 8) is read. It is determined if the value of the counter is zero. If not, it is reported at final step 196 that preprocessing is not available.

If the value of the preprocessing counter is zero, i.e., the determination at decision step 176 is affirmative, then at step 178 a hash composition factor hs from the set of hash composition factors 0, 1, . . . , num_hs is randomly selected.

Next, at step 180 an index j in the range of 0 to d−1 is obtained randomly.

Next, at step 182, using the hash composition factor obtained in step 178, the position $h_j(x)$ is read from table j.

Next, at decision step 184, it is determined if one single size item is stored at the position $h_j(x)$. If the determination at decision step 184 is affirmative, then control proceeds to final step 186. The single size item x is stored in the vacant way. The preprocessing counter is incremented, the hash composition factor is updated in table 154 and the procedure terminates successfully. The preprocessing counter is incremented whenever an element is stored in the hash tables, and decremented when an element is removed.

If the determination at decision step 184 is negative, then control proceeds to step 188. The index j is incremented modulo d.

Next, at decision step 190, it is determined if d iterations of step 188 have occurred. If the determination at decision step 190 is negative, then control returns to step 182 to evaluate another table using the same hash composition factor.

If the determination at decision step 190 is affirmative, then control proceeds to step 192. The index hs is incremented modulo num_hs. Then at decision step 194, it is determined if num_hs iterations of step 192 have occurred. If the determination at decision step 194 is negative, then control returns to step 180 to randomly select another table for evaluation with a new hash composition factor.

If the determination at decision step 194 is affirmative, then control proceeds final step 196. Failure to find a suitable storage for the item x is reported.

Figure 11:
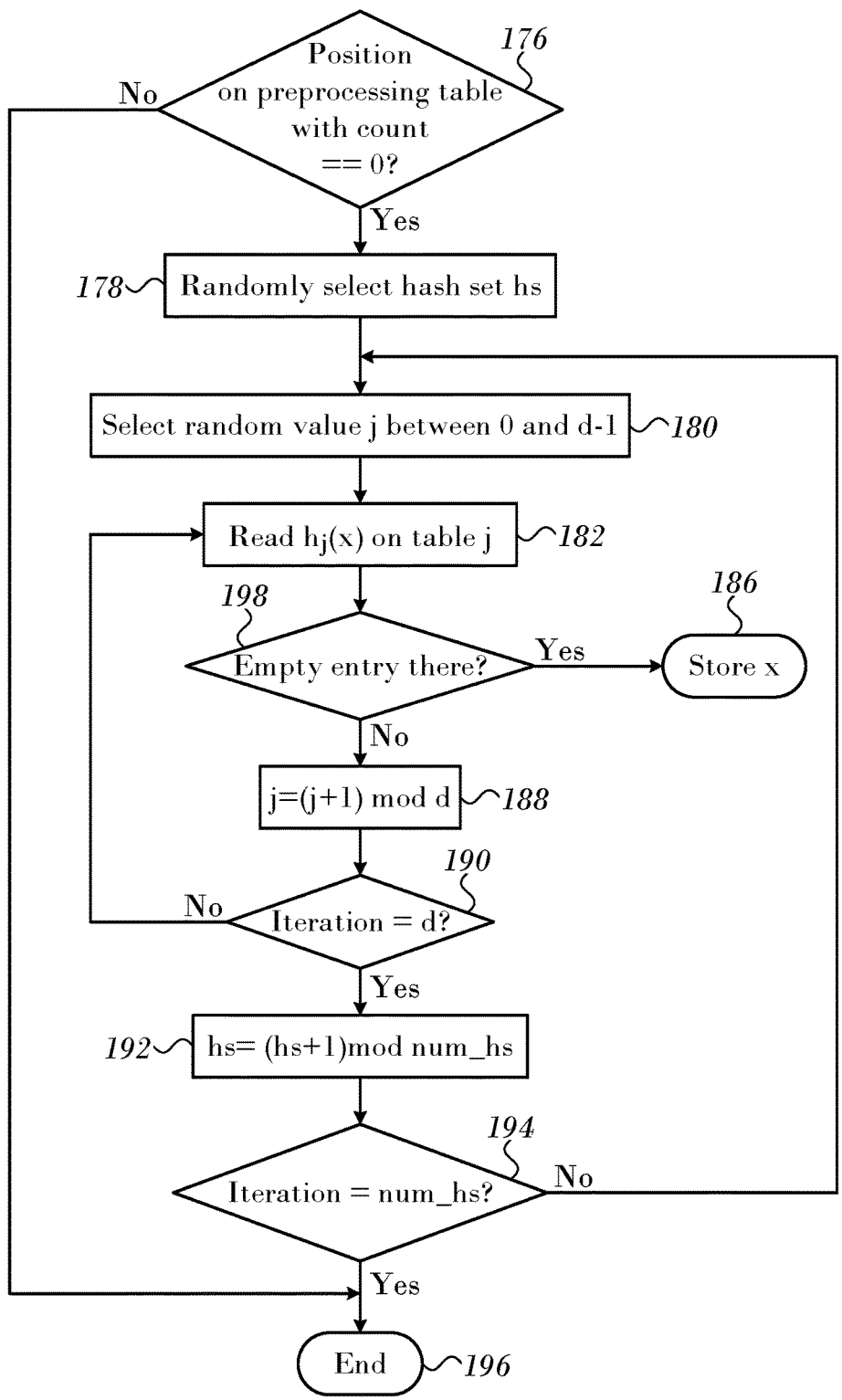
FIG. 11 is a detailed flow chart of a method for searching for a vacant entry in a hash table in accordance with an alternative embodiment of the invention.

Reference is now made to FIG. 11, which is a detailed flow chart of a method for searching for a vacant entry in a hash table in accordance with an alternative embodiment of the invention. This method may be used to perform decision steps 170, 172 (FIG. 9). The method is similar to that shown in FIG. 10, except following step 182 at decision step 198 is determined whether the entry at the position $h_j(x)$ is vacant.

Double Size Item Insertion.

Figure 12:
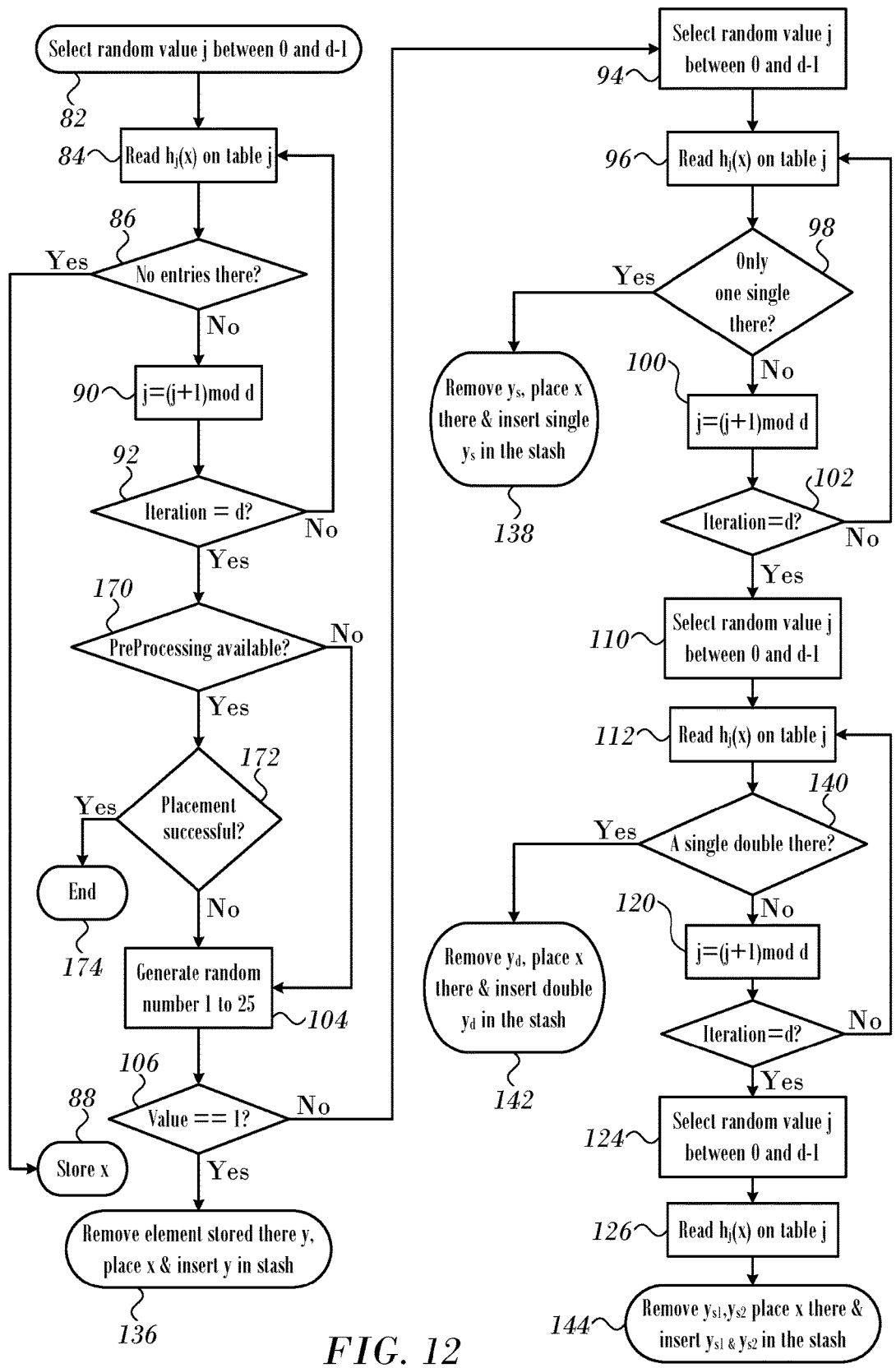
FIG. 12 is a method for insertion of a double size item in a hash table in accordance with an alternative embodiment of the invention.

Reference is now made to FIG. 12, which is a method for insertion of a double size item in a hash table accordance with an alternative embodiment of the invention. The first part of the process, steps 82-92; is the same as when preprocessing is not used and is to search for empty positions in which to place the double size item (final step 88).

However, if the search fails, preprocessing is used to also search for empty places by performing decision steps 170, 172 and the search procedure shown in FIG. 11.

If finally no empty position is found, i.e., the determination at decision step 170 or decision step 172 is negative, then the remainder of the search is done in the same manner as for double size item insertion without preprocessing, as described in FIG. 6 beginning at step 104. Again, from an implementation perspective, it may be more efficient to first scan all the positions and log the results and then select the position to insert the item or the item to be moved.

Simulation Results.

The proposed schemes have been implemented as described in the previous section. In all cases, an ASIC implementation was simulated in which all the tables were accessed in parallel. The main optimizations are search time, table occupancy and implementation complexity.

The parameters for the cuckoo hash implementation without preprocessing are:
  Number of hash tables d=4.
  Number of ways b=2.
  Stash size st=4 (doubles).
  Size of the Cuckoo hash tables (total sum of all tables) m=32K.
  Size of the single items w=128 bits.
  Maximum number of movements between insertions maxm: 1000.

For the preprocessing enhanced Cuckoo the parameters are:
  Number of hash tables d=2.
  Number of ways b=2.
  Stash size st=4 (doubles).
  Size of the Cuckoo hash tables (total sum of all tables) m=32K.
  Size of the single items w=128 bits.
  Maximum number of movements between insertions maxm: 1000.
  Size of preprocessing table p=32K.
  Number of bits in preprocessing counter c=4.
  Number of bits in hash composition factor s=3.

The hash functions used in the simulations are CRC based functions generated using two different polynomials as described in the above-referenced application Ser. No. 14/846,777.

In a first set of experiments, different insertion algorithms were evaluated until the ones described in the previous section were selected. Many different options were explored and tested.

To validate the performance of the algorithm, the percentage of single and double items has been varied between 0% and 100%. In a first experiment, 100K tests were run. The results in terms of worst case occupancy are summarized on the tables below. A stash size of 3 doubles is also reported to illustrate the impact of reducing the stash on occupancy.

TABLE 2

Minimum occupancy on failure when preprocessing is disabled.

| % single | 0 | 10 | 20 | 30 | 40 | 50 | 60 | 70 | 80 | 90 | 100 |
|---|---|---|---|---|---|---|---|---|---|---|---|
| stash = 4 | 96.54 | 93.29 | 91.71 | 91.98 | 92.51 | 92.78 | 93.74 | 94.96 | 96.47 | 97.96 | 99.63 |
| stash = 3 | 96.40 | 92.03 | 91.87 | 89.65 | 89.72 | 91.16 | 92.11 | 91.78 | 96.59 | 97.99 | 99.59 |

TABLE 3

Minimum occupancy on failure when preprocessing is enabled

| % single | 0 | 10 | 20 | 30 | 40 | 50 | 60 | 70 | 80 | 90 | 100 |
|---|---|---|---|---|---|---|---|---|---|---|---|
| stash = 4 | 98.52 | 96.92 | 96.13 | 95.45 | 95.20 | 94.50 | 94.26 | 93.82 | 94.92 | 98.07 | 100 |
| stash = 3 | 98.49 | 96.06 | 94.96 | 92.44 | 88.57 | 89.32 | 86.69 | 85.52 | 90.44 | 94.87 | 99.90 |

It can be observed that:

Performance for all single items is the same as for a traditional Cuckoo hash with d=4 and b=2 (for preprocessing with d=2).

Performance for all double items is the same as for a traditional Cuckoo hash with d=4 and b=1 (for preprocessing with d=2).

Worst case performance occurs for 20% of singles when preprocessing is not used and for 70% of singles when preprocessing is used. This difference in the worst case may be related to the preprocessing algorithm or to the different choice for placing single items and moving when inserting doubles that are selected in each algorithm.

The no preprocessing implementation achieved occupancies larger than 91% in all cases.

The preprocessing implementation also achieved occupancies larger than 93% in all cases.

Reducing the stash size to three has a moderate impact on the occupancy that can be achieved for the no preprocessing case. On the other hand the impact is significant for the preprocessing case for some single size/double size (S/D) ratios.

In the second experiment, the influence of the order of insertions on the occupancy is explored. First up to 45% occupancy only single size item items are inserted. After that, only double size items are inserted. Then the experiment is repeated but inserting first all double size items up to 45% and then all single size items. A set of 100K runs were made. The results when preprocessing is disabled showed a worst case occupancy of 94.00% in the first case (single size items first) and of 93.59% (double size items first) in the second case. The results are not directly comparable as the S/D ratio is not the same in both cases (45% fixed for either single size items or double size items and the rest, which depends on the occupancy achieved, is the other type). The same experiment was run but inserting up to 85% of single size items or double size items and then the rest of the other type. In this case, the results were, 96.47% in the first case and 98.82% in the second. In all the cases, the performance was better than the worst case occupancy in Table 2.

The same experiment has been repeated for the preprocessing case. The results obtained showed a worst case occupancy of 92.48% in the first case (single size items first)

and of 96.13% (double size items first) in the second case. This means that placing double size items first is easier. Also in this case, it should be noticed that the results are not directly comparable as the S/D ratio is not the same in both cases (45% fixed for single size item or double size items and the rest, which depends on the occupancy achieved, is the other type). The same experiment was run but inserting up to 85% of single size item or double size items and then the rest of the other type. In this case, the results were, 98.07% in the first case and 98.82% in the second. In all the cases, the performance was better than the worst case occupancy in Table 3.

In the steady state, in a real application, entries are added and removed continuously. To study the performance in this scenario, dynamic simulations have been run in a third experiment. In this case, the entries added up to 90% occupancy. Then 1% were removed and 1% were added and the process repeated until a failure occurs or $10^9$ items have been transferred, i.e., inserted and/or removed. Here a failure means that the stash overflows and therefore an item cannot be handled by the procedure. This process was repeated 10 times. The simulations were run with and without preprocessing. Without preprocessing, no failure occurred for any S/D distribution. In the case of preprocessing some failures did occur: for 60% singles once after 586 million transfers and for 70% singles four times after 390, 407, 670, and 857 million transfers. Therefore, failures are unlikely. An additional experiment was done to check if allowing more iterations (maxm=2000) between insertions would eliminate the failures observed for the preprocessing case. The results showed only two failures, one for 60% singles in which one try failed after 847 million transfers and for 70% singles in which one try failed after 582 million transfers. These results that increasing the number of iterations between insertions reduces the failures but does not eliminate them.

CONCLUSIONS

The results of the simulations show that it is possible to implement a Cuckoo hash that provides exact matching for both single size and double size items, with and without preprocessing enhancements. In both types, over 90% occupancies are achieved in the worst case.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A decision apparatus, comprising:
a first memory bank, containing a plurality of hash tables of associative entries comprising a respective entry key and a respective value, the hash tables being accessible in multiple ways including a first way and a second way, the associative entries comprising single size items and double size items;
a second memory bank containing a stash of associative entries;
a logic pipeline, which is configured to receive a sequence of data items, to extract a search key from each of the data items, the logic pipeline comprising:
a hash circuit configured to apply first and second hash functions to the search key to generate first and second indices;
a lookup circuit configured to read the associative entries in the hash tables that are indicated respectively by the first and second indices and to match the search key against the associative entries of the hash tables in all the ways, and upon finding a match between the search key and the respective entry key in an indicated associative entry, to output the respective value from the indicated associative entry;
a processor configured, using the respective value output by the lookup circuit, to insert the associative entries of the stash into the hash tables in accordance with a single size cuckoo hashing insertion procedure and a double size cuckoo hashing insertion procedure for the single size items and the double size items, respectively.

2. The apparatus according to claim 1, wherein the single size cuckoo hashing insertion procedure for a selected single size item comprises:
conducting a first search of the hash tables for a first position having first and second vacant ways, and when the first search is successful, storing the selected single size item in one of the first and second vacant ways;
when the first search is unsuccessful, conducting a second search of the hash tables for a second position wherein the first way of the second position is vacant and the second way of the second position is occupied, and when the second search is successful, storing the selected single size item in the first way of the second position;
when the second search is unsuccessful and when a predetermined probability is satisfied, evicting an occupant of one of the ways of a chosen position of one of the hash tables into the stash and storing the selected single size item in the one way of the chosen position; and
when the predetermined probability is not satisfied, conducting a third search of the hash tables for a third position wherein the first way and the second way of the third position have respective first and second occupying single size items, and when the third search is successful, evicting the first occupying single size item into the stash, and storing the selected single size item in the first way of the third position.

3. The apparatus according to claim 2, further comprising the step of when the third search is unsuccessful, when space for a double size item is unavailable on the stash, inserting the selected single size item into the stash;
when space for a double size item is available on the stash evicting a double size occupant of a new chosen position of one of the hash tables into the stash; and
storing the selected single size item in the new chosen position.

4. The apparatus according to claim 3, wherein the chosen position and the new chosen position are randomly chosen.

5. The apparatus according to claim 1, wherein the double size cuckoo hashing insertion procedure for a selected double size item comprises:
conducting a first search of the hash tables for a first position having first and second vacant ways, and when the first search is successful, storing the selected double size item in the first and second vacant ways;
when the first search is unsuccessful and when a predetermined probability is satisfied, evicting occupants of a chosen position of one of the hash tables into the stash, and storing the selected double size item in the first way and the second way of the chosen position; and when the predetermined probability is not satisfied, conducting a second search of the hash tables for a second position wherein the first way of the second position is vacant and the second way of the second position has an occupying single size item, and when the second search is successful, evicting the occupying single size item into the stash and storing the selected double size item in the second position;

when the second search is unsuccessful, conducting a third search of the hash tables for a third position having an occupying double size item, and when the third search is successful evicting the occupying double size item and storing the selected double size item in the third position; and when the third search is unsuccessful, evicting occupants of a new chosen position of one of the hash tables into the stash; and storing the selected double size item in the new chosen position.

6. The apparatus according to claim 5, wherein the chosen position and the new chosen position are randomly chosen.

7. A decision apparatus, comprising:

a first memory bank, containing a first table of hash composition factors;

a second memory bank, containing second and third hash tables of associative entries, each of the associative entries comprising a respective entry key and a respective value, the hash tables being accessible in multiple ways including a first way and a second way, the associative entries comprising single size items and double size items;

a third memory bank containing a stash of associative entries;

a logic pipeline, which is configured to receive a sequence of data items, and to extract a search key from each data item, and which comprises:

a pre-hash circuit, configured to compute a first index by applying a first hash function to the search key;

a first lookup circuit, which is coupled to read a hash composition factor from a location in the first memory bank indicated by the first index;

a hash circuit, which is configured to compute second and third indices as different combinations, determined by the hash composition factor, of second and third hash functions applied by the hash circuit to the search key;

a second lookup circuit, which is configured to read the associative entries in the second and third hash tables that are indicated respectively by the second and third indices, and upon finding a match between the search key and the respective entry key in an indicated entry, to output the respective value from the indicated entry; and a processor, responsively to outputs of the first lookup circuit and the second lookup circuit, configured to insert values of the hash composition factor into the first table and the associative entries into the second and third hash tables in accordance with a single size cuckoo hashing insertion procedure and a double size cuckoo hashing insertion procedure for the single size items and the double size items, respectively.

8. The apparatus according to claim 7, wherein the single size cuckoo hashing insertion procedure for a selected single size item comprises:

with respective first hash composition factors from the first table iteratively conducting a first search of the hash tables for a first position wherein the first way of the first position is vacant and the second way of the first position is occupied, and when an iteration of the first search is successful, storing the selected single size item in the first way of the first position;

when the iterations of the first search are unsuccessful, iteratively conducting a second search of the hash tables for a second position having first and second vacant ways, and when an iteration of the second search is successful, storing the selected single size item in one of the first and second vacant ways;

when the iterations of the second search are unsuccessful and when a predetermined probability is satisfied, evicting an occupant of one of the ways of a chosen position of one of the hash tables into the stash and storing the selected single size item in the one way of the chosen position; and when the predetermined probability is not satisfied, conducting a third search of the hash tables for a third position wherein the first way and the second way of the third position have respective first and second occupying single size items, and when the third search is successful, evicting the first occupying single size item into the stash, and storing the selected single size item in the first way of the third position.

9. The apparatus according to claim 8, further comprising the step of when the third search is unsuccessful, when space for a double size item is unavailable on the stash, inserting the selected single size item into the stash;

when space for a double size item is available on the stash evicting a double size occupant of a new chosen position of one of the hash tables into the stash; and storing the selected single size item in the new chosen position.

10. The apparatus according to claim 9, wherein the chosen position, the new chosen position and the hash composition factors are selected randomly.

11. The apparatus according to claim 7, wherein the double size cuckoo hashing insertion procedure for a selected double size item comprises:

with respective hash composition factors from the first table iteratively conducting a first search of the hash tables for a first position having first and second vacant ways, and when the first search is successful, storing the selected double size item in the first and second vacant ways;

when the first search is unsuccessful and when a predetermined probability is satisfied, evicting occupants of a chosen position of one of the hash tables into the stash, and storing the selected double size item in the first way and the second way of the chosen position; and when the predetermined probability is not satisfied, iteratively conducting a second search of the hash tables for a second position wherein the first way of the second position is vacant and the second way of the second position has an occupying single size item, and when an iteration of the second search is successful, evicting the occupying single size item into the stash and storing the selected double size item in the second position;

when the iterations of the second search are unsuccessful, conducting a third search of the hash tables for a third position having an occupying double size item, and when the third search is successful evicting the occupying double size item and storing the selected double size item in the third position; and when the third search is unsuccessful, evicting occupants of a new chosen position of one of the hash tables into the stash; and storing the selected double size item in the new chosen position.

12. The apparatus according to claim 11, wherein the chosen position, the new chosen position and the hash composition factors are selected randomly.

13. A method, comprising:
in a first memory bank of a network element storing a plurality of hash tables of associative entries comprising a respective entry key and a respective value, the hash tables being accessible in multiple ways including a first way and a second way, the associative entries comprising single size items and double size items;
in a second memory bank storing a stash of associative entries;
receiving a sequence of data items;
extracting a search key from each of the data items;
applying first and second hash functions to the search key to generate first and second indices;
reading the associative entries in the hash tables that are indicated respectively by the first and second indices
matching the search key against the associative entries of the hash tables in all the ways, and upon finding a match between the search key and the respective entry key in an indicated associative entry, outputting the respective value from the indicated associative entry; and
responsively to the respective value from the indicated associative entry inserting the associative entries of the stash into the hash tables in accordance with a single size cuckoo hashing insertion procedure and a double size cuckoo hashing insertion procedure for the single size items and the double size items, respectively.

14. The method according to claim 13, wherein the single size cuckoo hashing insertion procedure for a selected single size item comprises:
conducting a first search of the hash tables for a first position having first and second vacant ways, and when the first search is successful, storing the selected single size item in one of the first and second vacant ways;
when the first search is unsuccessful, conducting a second search of the hash tables for a second position wherein the first way of the second position is vacant and the second way of the second position is occupied, and when the second search is successful, storing the selected single size item in the first way of the second position;
when the second search is unsuccessful and when a predetermined probability is satisfied, evicting an occupant of one of the ways of a chosen position of one of the hash tables into the stash and storing the selected single size item in the one way of the chosen position; and
when the predetermined probability is not satisfied, conducting a third search of the hash tables for a third position wherein the first way and the second way of the third position have respective first and second occupying single size items, and when the third search is successful, evicting the first occupying single size item into the stash, and storing the selected single size item in the first way of the third position.

15. The method according to claim 14, further comprising the step of when the third search is unsuccessful, when space for a double size item is unavailable on the stash, inserting the selected single size item into the stash;
when space for a double size item is available on the stash evicting a double size occupant of a new chosen position of one of the hash tables into the stash; and storing the selected single size item in the new chosen position.

16. The method according to claim 13, wherein the double size cuckoo hashing insertion procedure for a selected double size item comprises:
conducting a first search of the hash tables for a first position having first and second vacant ways, and when the first search is successful, storing the selected double size item in the first and second vacant ways;
when the first search is unsuccessful and when a predetermined probability is satisfied, evicting occupants of a chosen position of one of the hash tables into the stash, and storing the selected double size item in the first way and the second way of the chosen position; and
when the predetermined probability is not satisfied, conducting a second search of the hash tables for a second position wherein the first way of the second position is vacant and the second way of the second position has an occupying single size item, and when the second search is successful, evicting the occupying single size item into the stash and storing the selected double size item in the second position;
when the second search is unsuccessful, conducting a third search of the hash tables for a third position having an occupying double size item, and when the third search is successful evicting the occupying double size item and storing the selected double size item in the third position; and
when the third search is unsuccessful, evicting occupants of a new chosen position of one of the hash tables into the stash; and
storing the selected double size item in the new chosen position.

17. A computer software product, including a non-transitory computer-readable storage medium in which computer program instructions are stored, which instructions, when executed by a computer, cause the computer to perform the steps of:
in a first memory bank storing a plurality of hash tables of associative entries comprising a respective entry key and a respective value, the hash tables being accessible in multiple ways including a first way and a second way, the associative entries comprising single size items and double size items;
in a second memory bank storing a stash of associative entries;
receiving a sequence of data items;
extracting a search key from each of the data items;
applying first and second hash functions to the search key to generate first and second indices;
reading the associative entries in the hash tables that are indicated respectively by the first and second indices
matching the search key against the associative entries of the hash tables in all the ways, and upon finding a match between the search key and the respective entry key in an indicated associative entry, outputting the respective value from the indicated associative entry; and
responsively to the respective value from the indicated associative entry inserting the associative entries of the stash into the hash tables in accordance with a single size cuckoo hashing insertion procedure and a double size cuckoo hashing insertion procedure for the single size items and the double size items, respectively.

18. The computer software product according to claim 17, wherein the single size cuckoo hashing insertion procedure for a selected single size item comprises:
- conducting a first search of the hash tables for a first position having first and second vacant ways, and when the first search is successful, storing the selected single size item in one of the first and second vacant ways;
- when the first search is unsuccessful, conducting a second search of the hash tables for a second position wherein the first way of the second position is vacant and the second way of the second position is occupied, and when the second search is successful, storing the selected single size item in the first way of the second position;
- when the second search is unsuccessful and when a predetermined probability is satisfied, evicting an occupant of one of the ways of a chosen position of one of the hash tables into the stash and storing the selected single size item in the one way of the chosen position; and
- when the predetermined probability is not satisfied, conducting a third search of the hash tables for a third position wherein the first way and the second way of the third position have respective first and second occupying single size items, and when the third search is successful, evicting the first occupying single size item into the stash, and storing the selected single size item in the first way of the third position.

19. The computer software product according to claim 18, when the third search is unsuccessful the instructions cause the computer to perform the steps of, when space for a double size item is unavailable on the stash, inserting the selected single size item into the stash;
- when space for a double size item is available on the stash evicting a double size occupant of a new chosen position of one of the hash tables into the stash; and
- storing the selected single size item in the new chosen position.

20. The computer software product according to claim 17, wherein the double size cuckoo hashing insertion procedure for a selected double size item comprises:
- conducting a first search of the hash tables for a first position having first and second vacant ways, and when the first search is successful, storing the selected double size item in the first and second vacant ways;
- when the first search is unsuccessful and when a predetermined probability is satisfied, evicting occupants of a chosen position of one of the hash tables into the stash, and storing the selected double size item in the first way and the second way of the chosen position; and
- when the predetermined probability is not satisfied, conducting a second search of the hash tables for a second position wherein the first way of the second position is vacant and the second way of the second position has an occupying single size item, and when the second search is successful, evicting the occupying single size item into the stash and storing the selected double size item in the second position;
- when the second search is unsuccessful, conducting a third search of the hash tables for a third position having an occupying double size item, and when the third search is successful evicting the occupying double size item and storing the selected double size item in the third position; and
- when the third search is unsuccessful, evicting occupants of a new chosen position of one of the hash tables into the stash; and
- storing the selected double size item in the new chosen position.

\* \* \* \* \*